United States Patent
Chen et al.

(10) Patent No.: US 6,611,756 B1
(45) Date of Patent: *Aug. 26, 2003

(54) METHOD FOR PREDICTING NAVIGATION INFORMATION IN A GLOBAL POSITIONING SYSTEM

(75) Inventors: Phil Fu-Wei Chen, Denville, NJ (US); Andrew Todd Zidel, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/635,616

(22) Filed: Aug. 10, 2000

(51) Int. Cl.[7] .............................................. G01C 21/26
(52) U.S. Cl. ..................... 701/213; 701/214; 701/215; 342/357.06; 342/357.02
(58) Field of Search ................................ 701/213, 214, 701/215, 200; 342/357.05, 357.06, 357.01, 357.08, 357.1, 357.12, 457, 358, 357.02, 357.03; 455/12.1

(56) References Cited

U.S. PATENT DOCUMENTS

| | | | | |
|---|---|---|---|---|
| 5,872,539 A | * | 2/1999 | Mullen | 342/357.17 |
| 6,114,991 A | * | 9/2000 | Richton et al. | 342/357.1 |
| 6,118,977 A | * | 9/2000 | Vannucci | 455/12.1 |
| 6,201,497 B1 | * | 3/2001 | Snyder et al. | 342/357.06 |
| 6,252,545 B1 | * | 6/2001 | Da et al. | 342/357.1 |
| 6,256,475 B1 | * | 7/2001 | Vannucci | 455/12.1 |
| 6,259,400 B1 | * | 7/2001 | Higgins et al. | 342/357.06 |

FOREIGN PATENT DOCUMENTS

| | | | |
|---|---|---|---|
| EP | 1 008 862 A1 | 6/2000 | G01S/5/14 |
| EP | 1 122 553 A2 | 8/2001 | G01S/5/14 |

* cited by examiner

Primary Examiner—Jacques H. Louis-Jacques

(57) ABSTRACT

A method for enhancing data wipeoff by predicting future navigation data. Data wipeoff using predicted future navigation data reduces or eliminates incomplete data wipeoff, thereby enhancing GPS receiver sensitivity and reducing acquisition times. Predicting future navigation data involves receiving navigation data and using the received navigation data to generate predicted future navigation data, wherein the predicted future navigation data should be approximately identical to navigation data received at a future time. The predicted future navigation data is subsequently used to perform data wipeoff.

20 Claims, 19 Drawing Sheets

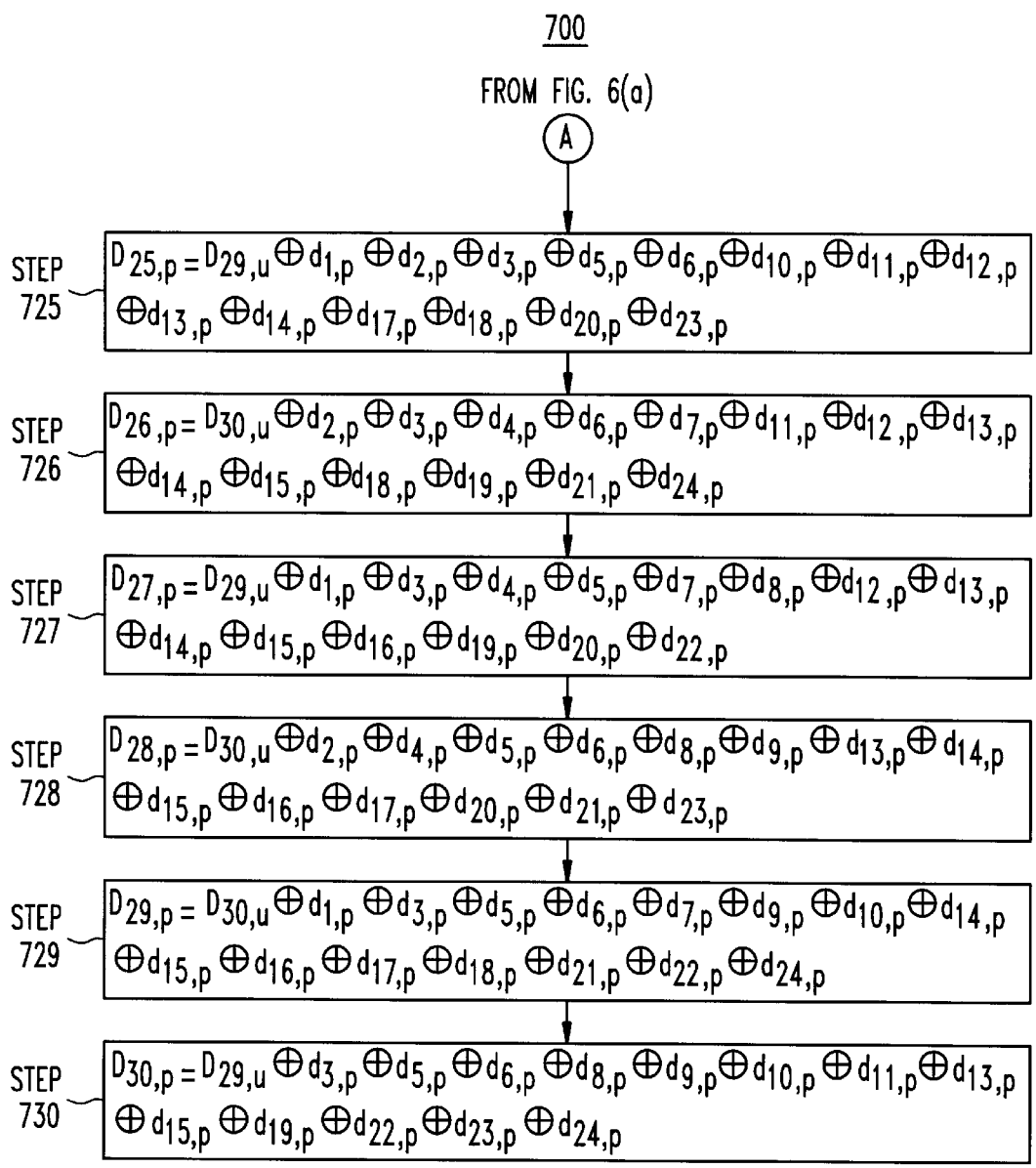

FROM FIG. 6(a)

Ⓐ

STEP 725: $D_{25,p} = D_{29,u} \oplus d_{1,p} \oplus d_{2,p} \oplus d_{3,p} \oplus d_{5,p} \oplus d_{6,p} \oplus d_{10,p} \oplus d_{11,p} \oplus d_{12,p} \oplus d_{13,p} \oplus d_{14,p} \oplus d_{17,p} \oplus d_{18,p} \oplus d_{20,p} \oplus d_{23,p}$ STEP 726: $D_{26,p} = D_{30,u} \oplus d_{2,p} \oplus d_{3,p} \oplus d_{4,p} \oplus d_{6,p} \oplus d_{7,p} \oplus d_{11,p} \oplus d_{12,p} \oplus d_{13,p} \oplus d_{14,p} \oplus d_{15,p} \oplus d_{18,p} \oplus d_{19,p} \oplus d_{21,p} \oplus d_{24,p}$ STEP 727: $D_{27,p} = D_{29,u} \oplus d_{1,p} \oplus d_{3,p} \oplus d_{4,p} \oplus d_{5,p} \oplus d_{7,p} \oplus d_{8,p} \oplus d_{12,p} \oplus d_{13,p} \oplus d_{14,p} \oplus d_{15,p} \oplus d_{16,p} \oplus d_{19,p} \oplus d_{20,p} \oplus d_{22,p}$ STEP 728: $D_{28,p} = D_{30,u} \oplus d_{2,p} \oplus d_{4,p} \oplus d_{5,p} \oplus d_{6,p} \oplus d_{8,p} \oplus d_{9,p} \oplus d_{13,p} \oplus d_{14,p} \oplus d_{15,p} \oplus d_{16,p} \oplus d_{17,p} \oplus d_{20,p} \oplus d_{21,p} \oplus d_{23,p}$ STEP 729: $D_{29,p} = D_{30,u} \oplus d_{1,p} \oplus d_{3,p} \oplus d_{5,p} \oplus d_{6,p} \oplus d_{7,p} \oplus d_{9,p} \oplus d_{10,p} \oplus d_{14,p} \oplus d_{15,p} \oplus d_{16,p} \oplus d_{17,p} \oplus d_{18,p} \oplus d_{21,p} \oplus d_{22,p} \oplus d_{24,p}$ STEP 730: $D_{30,p} = D_{29,u} \oplus d_{3,p} \oplus d_{5,p} \oplus d_{6,p} \oplus d_{8,p} \oplus d_{9,p} \oplus d_{10,p} \oplus d_{11,p} \oplus d_{13,p} \oplus d_{15,p} \oplus d_{19,p} \oplus d_{22,p} \oplus d_{23,p} \oplus d_{24,p}$

800

FIG. 11 (a)
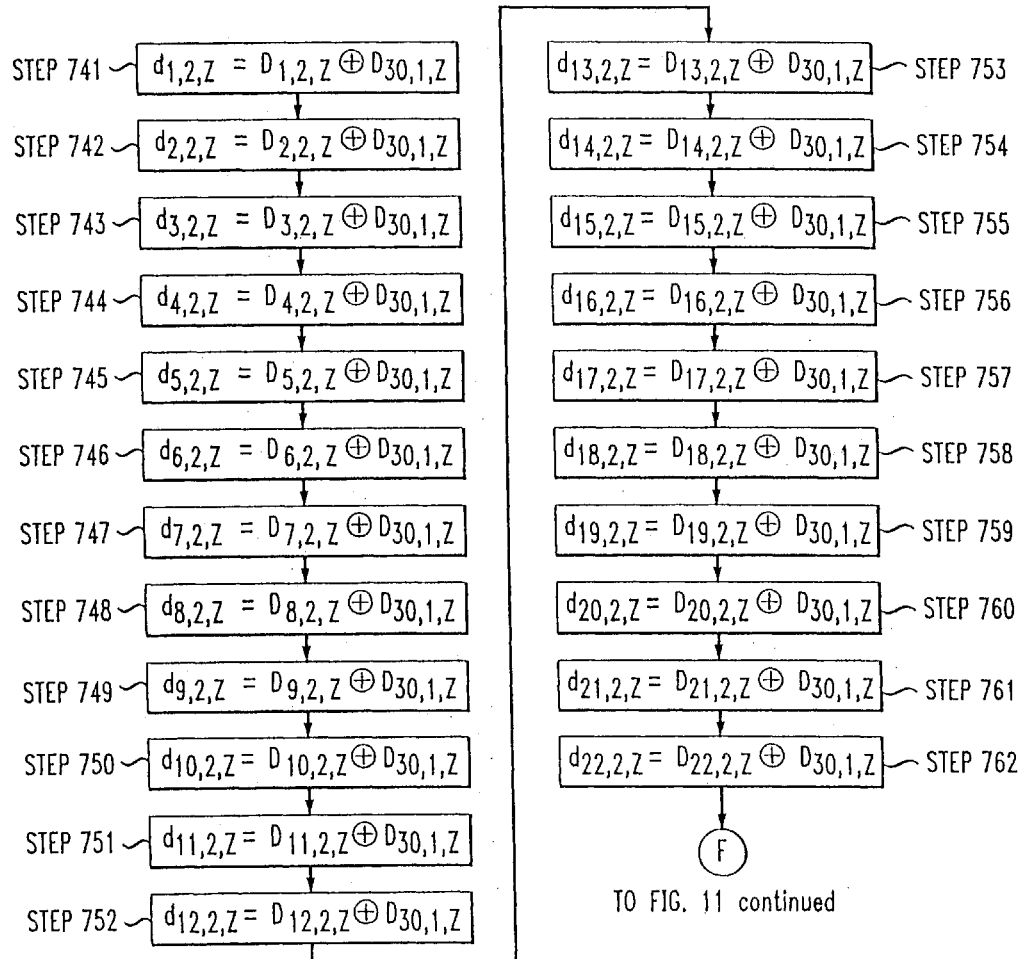
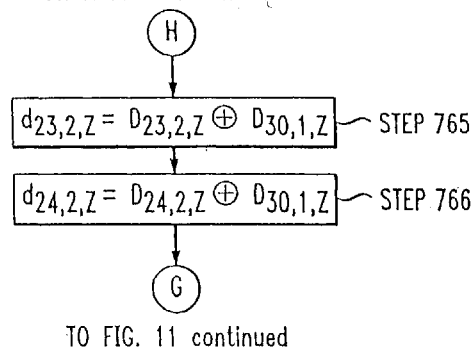

*FIG. 11 (b)*
740

FROM FIG. 11
(F)

STEP 763: $d_{24,2,Z} = D_{30,1,Z} \oplus d_{1,2,Z} \oplus d_{3,2,Z} \oplus d_{5,2,Z} \oplus d_{6,2,Z} \oplus d_{7,2,Z} \oplus d_{9,2,Z} \oplus d_{10,2,Z} \oplus d_{14,2,Z} \oplus d_{15,2,Z} \oplus d_{16,2,Z} \oplus d_{17,2,Z} \oplus d_{18,2,Z} \oplus d_{21,2,Z} \oplus d_{22,2,Z}$ STEP 764: $d_{23,2,Z} = D_{29,1,Z} \oplus d_{3,2,Z} \oplus d_{5,2,Z} \oplus d_{6,2,Z} \oplus d_{8,2,Z} \oplus d_{9,2,Z} \oplus d_{10,2,Z} \oplus d_{11,2,Z} \oplus d_{13,2,Z} \oplus d_{15,2,Z} \oplus d_{19,2,Z} \oplus d_{22,2,Z} \oplus d_{24,2,Z}$ (H)
TO FIG. 11
FROM FIG. 11
(G)

STEP 775: $D_{25,2,Z} = D_{29,1,Z} \oplus d_{1,2,Z} \oplus d_{2,2,Z} \oplus d_{3,2,Z} \oplus d_{5,2,Z} \oplus d_{6,2,Z} \oplus d_{10,2,Z} \oplus d_{11,2,Z} \oplus d_{12,2,Z} \oplus d_{13,2,Z} \oplus d_{14,2,Z} \oplus d_{17,2,Z} \oplus d_{18,2,Z} \oplus d_{21,2,Z} \oplus d_{23,2,Z}$ STEP 776: $D_{26,2,Z} = D_{30,1,Z} \oplus d_{2,2,Z} \oplus d_{3,2,Z} \oplus d_{4,2,Z} \oplus d_{6,2,Z} \oplus d_{7,2,Z} \oplus d_{11,2,Z} \oplus d_{12,2,Z} \oplus d_{13,2,Z} \oplus d_{14,2,Z} \oplus d_{15,2,Z} \oplus d_{18,2,Z} \oplus d_{19,2,Z} \oplus d_{21,2,Z} \oplus d_{24,2,Z}$ STEP 777: $D_{27,2,Z} = D_{29,1,Z} \oplus d_{1,2,Z} \oplus d_{3,2,Z} \oplus d_{4,2,Z} \oplus d_{5,2,Z} \oplus d_{7,2,Z} \oplus d_{8,2,Z} \oplus d_{12,2,Z} \oplus d_{13,2,Z} \oplus d_{14,2,Z} \oplus d_{15,2,Z} \oplus d_{16,2,Z} \oplus d_{19,2,Z} \oplus d_{20,2,Z} \oplus d_{22,2,Z}$ STEP 778: $D_{28,2,Z} = D_{30,1,Z} \oplus d_{2,2,Z} \oplus d_{4,2,Z} \oplus d_{5,2,Z} \oplus d_{6,2,Z} \oplus d_{8,2,Z} \oplus d_{9,2,Z} \oplus d_{13,2,Z} \oplus d_{14,2,Z} \oplus d_{15,2,Z} \oplus d_{16,2,Z} \oplus d_{17,2,Z} \oplus d_{20,2,Z} \oplus d_{21,2,Z} \oplus d_{23,2,Z}$

METHOD FOR PREDICTING NAVIGATION INFORMATION IN A GLOBAL POSITIONING SYSTEM

CROSS REFERENCE TO RELATED APPLICATION

Related subject matter is disclosed in the following applications filed concurrently and assigned to the same Assignee hereof: U.S. patent application Ser. No. 09,635,617, entitled "A METHOD OF ALIGNING PREDICTED NAVIGATION INFORMATION", inventors Phil Fu-Wei Chen and Andrew T. Zidel.

FIELD OF THE INVENTION

The present invention relates generally to the field of wireless communications and, in particular, to geographical location using wireless communications systems.

BACKGROUND OF THE RELATED ART

Geographical location, or geolocation, involves determining the position of a mobile wireless device. Prior art geolocation systems use satellite-based navigation equipment to provide accurate, three-dimensional position information. One well-known satellite-based navigation system is the Global Positioning System (GPS).

FIG. 12 depicts a GPS system 10 used in accordance with the prior art. GPS system 10 comprises a plurality of satellites 12-j, at least one controlling ground station 20, and at least one GPS receiver 30, where j=1, 2, . . . , J. Each satellite 12-j orbits the Earth 16 at a known speed $v_j$ and is a known distance from the other satellites 12-j. Each satellite 12-j transmits a GPS signal 14-j, which is a carrier signal at a known frequency f that is bipolar phase shift key (BPSK) modulated using a unique pseudo-random noise (PN-j) code and navigation data (ND-j) associated with that particular satellite. The PN-j code and the navigation data ND-j are combined via modulo-two addition prior to modulating the carrier signal. The navigation data ND-j includes a satellite identifier, timing information, satellite health indicators, orbital data and parity bits.

Controlling ground station 20 comprises an antenna 22 for receiving GPS signals 14-j and transmitting correction signals 24-j, a plurality of correlators 26-m for detecting GPS signals 14-j and a processor 28 having software for tracking GPS satellites 12-j using detected GPS signals and for determining correction signals 24-j for each satellite, where m=1, . . . , M. Correction signals 24-j include satellite clock offsets from actual GPS system time, such as bias and drift components, for purposes of providing updated position and timing information to GPS satellites 12-j.

FIG. 13 depicts GPS receiver 30 comprising an antenna 32 for receiving GPS signals 14-j, a plurality of correlators 34-k for detecting GPS signals 14-j, a processor 36 having software for determining a geolocation position using the detected GPS signals 14-j, a preamplifier/ prefilter 102 to filter and boost received GPS signals 14-j, a frequency synthesizer 106, a reference oscillator 108 to provide timing to frequency synthesizer 106, and a clock 118 to provide timing to processor 36, where k=1,2, . . . ,K. Correlators 34-k include a pseudo-random noise (PN) code generator 110, multipliers 104 and 112, and an integrate and dump filter 114. GPS receiver 30 detects GPS signals 14-j via PN-j codes. Note that PN code generator 110 may or may not be part of correlator 34-k.

Detecting GPS signals 14-j involves a correlation process wherein correlators 34-k search received GPS signals 14-j for PN-j codes in a carrier frequency dimension and a code phase dimension. The correlation process is implemented using multiplier 112 to perform real-time multiplication of received GPS signals 14-j with phase shifted replicated PN-j codes modulated onto a replicated carrier signal at a known frequency and using and dump filter 114 to perform integrations on multiplier 112's output signal.

In the carrier frequency dimension, GPS receiver 30 replicates carrier signals using reference oscillator 108 and frequency synthesizer 106 to match the frequencies of GPS signals 14-j as they arrive at GPS receiver 30. Due to the Doppler effect, the frequency f at which GPS signals 14-j are transmitted changes an unknown amount $\Delta f_j$ before GPS signal 14-j arrives at GPS receiver 30. Thus, GPS signal 14-j has a frequency $f+\Delta f_j$ upon arrival at GPS receiver 30. GPS receiver 30 accounts for the Doppler effect by replicating the carrier signals across a frequency spectrum $f_{spec}$ ranging from $f+\Delta f_{min}$ to $f+\Delta f_{max}$ until the frequency of the replicated carrier signal matches the frequency of the received GPS signal 14-j, wherein $\Delta f_{min}$ and $\Delta f_{max}$ are a minimum and a maximum change in frequency GPS signals 14-j will undergo due to the Doppler effect as they travel from satellites 12-j to GPS receiver 30. In other words, $\Delta f_{min} \leq \Delta f_j \leq f_{max}$.

In the code phase dimension, GPS receiver 30 replicates the unique PN-j codes associated with each satellite 12-j using PN code generator 110 wherein the replicated PN-j codes are modulated onto replicated carrier signals via multiplier 104. The phases of the replicated PN-j codes are shifted across code phase spectrums $R_j(spec)$ until replicated carrier signals modulated with replicated PN-j codes correlate, if at all, with GPS signals 14-j being received by GPS receiver 30, wherein each code phase spectrum $R_j(spec)$ includes every possible phase shift for the associated PN-j code. That is, phase-shifted PN-j codes modulated onto replicated carrier signals are multiplied using multiplier 112 with received GPS signals 14-j to produce an output signal that undergoes and integrate and dump process via integrate and dump filter 114.

Correlators 34-k are configured to perform parallel searches for a plurality of PN-j codes across the frequency spectrum $f_{spec}$ and their associated code phase spectrum $R_j(spec)$, i.e. in both the frequency and code dimensions. Each of the plurality of correlators 34-k are dedicated to searching for a particular PN-j code across each possible frequency along $\Delta f_{min} \leq \Delta f_j \leq \Delta f_{max}$ and each possible phase shift for that PN-j code. When a correlator 34-k completes its search for a PN-j code, the correlator 34-k searches for another PN-j code in the same manner. This process continues until all PN-j codes are collectively searched for by the plurality of correlators 34-k. For example, suppose there are twelve satellites 12-j, thus there would be twelve unique PN-j codes. If GPS receiver 30 has six correlators 34-k, then GPS receiver 30 would use its correlators 34-k to search for two sets of six different PN-j codes at a time. Specifically, correlators 34-k search for the first six PN-j codes, i.e. correlator 34-1 searches for PN-1, correlator 34-2 searches for PN-2, etc. Upon completing the search for the first six PN-j codes, correlators 34-k search for the next six PN-j codes, i.e. correlator 34-1 searches for PN-7, correlator 34-2 searches for PN-8, etc.

For correlator 34-k searching for a each PN-j code, an integrate and dump process is performed for each combination of frequency and phase shifts for that PN-j code. For example, suppose the frequency spectrum $f_{spec}$ includes 50 possible frequencies for the carrier signal and the code phase spectrum $R_j(spec)$ for a PN-j code includes 2,046 possible half-chip phase shifts. To search for every possible combination of frequency and half-chip phase shifts for the PN-j code, the correlator 34-k would need to perform 102,300 integrations. A typical integration time for correlators 34-k is 1 ms, which is sufficient for GPS receiver 30 to detect GPS signals 14-j when there is a strong signal-to-noise ratio, such as where antenna 32 has a clear view of the sky or a direct line-of-sight to satellites 12-j. Thus, for this example, 102.3 seconds would be required for one correlator 34-k to search every possible combination of frequency and half-chip phase shifts for one PN-j code.

After GPS signals 14-j are detected by correlators 34-k, processor 36 calculates pseudo-ranges for each detected satellite 12-j by performing fast Fourier transform (FFT), discrete Fourier transform (DFT) or equivalent operations on the output signals of correlators 34-k. Each pseudo-range corresponding to an estimate of the distance from detected satellite 12-j to GPS receiver 30 based upon a propagation delay associated with GPS signal 14-j traveling from detected satellite 12-j to GPS receiver 30 plus delays based on timing offsets in clocks for satellite 12-j and GPS receiver 30 from actual GPS time. Pseudo-range measurements from GPS receiver 30 to detected satellites 12-j are combined using processor 36 to determine an approximate position of GPS receiver 30, as is well known in the art.

GPS receivers 30 are now being incorporated into mobile telephones or other types of mobile communications devices that do not always have a clear view of the sky. In these situations, signal-to-noise ratios of GPS signals 14-j received by GPS receiver 30 are typically much lower than when GPS receiver 30 has a clear view of the sky, thus making it more difficult for GPS receiver 30 to detect GPS signals 14-j. To compensate for weaker signal-to-noise ratios and enhance detection of GPS signals 14-j, correlators 34-k can be configured with longer integration times. A sufficient integration time, in this case, would be approximately 1 second. Thus, for the example above, 102,300 seconds would be required for a correlator 34-k to search for every possible combination of frequency and half-chip phase shifts for one PN-j code. Longer integration times result in undesirable longer acquisition times, i.e. time needed for detecting GPS signals 14-j.

Wireless assisted GPS (WAG) systems were developed to facilitate acquisition of GPS signals 14-j by GPS receivers configured with short or long integration times. The WAG system facilitates acquisition of GPS signals 14-j by reducing the number of integrations to be performed by correlators searching for GPS signals 14-j. The number of integrations is reduced by narrowing the frequency range and code phase ranges to be searched. Specifically, the WAG system limits the search for GPS signals 14-j to a specific frequency or frequencies and to a range of code phases less than the code phase spectrum $R_f(spec)$.

FIG. 14 depicts a prior art WAG system 200 comprising a WAG server 220, a plurality of base stations 230 and at least one WAG client 240. WAG server 220 is a device for facilitating detection of GPS signals 14-j by WAG client 240, and includes a GPS receiver 260 having an antenna 270 installed in a known location with a clear view of the sky, wherein GPS receiver 260 would typically have correlators configured with short integration times because antenna 270 has a clear view of the sky. WAG server 220 being operable to communicate with base stations 230 either through a wired or wireless interface. Each base station 230 has a known location and provides communication services to WAG clients 240 located within a geographical area or cell 250 associated with base station 230, wherein each cell 250 is a known size and is divided into a plurality of sectors. WAG client 240 includes GPS receiver 280, GPS antenna 285 and perhaps a mobile-telephone 290, and is typically in motion and/or in an unknown location with or without a clear view of the sky. GPS receiver 280 having correlators typically configured with long integration times. Note that the term "mobile-telephone" for purposes of this application, shall be construed to include, but is not limited to, any communication device.

WAG server 220 predicts frequencies and code phase search ranges for visible satellites based on detected GPS signals 14-j at WAG server 220 and a known location of base station 230 or cell 250 which is currently serving WAG client 240, wherein visible satellites are a set of all satellites 12-j which are in view of WAG server 220, i.e., WAG server 220 can detect GPS signals 14-j transmitted by visible satellites. This set of all satellites 12-j is known as a visible set. The predicted frequencies and code phase search ranges for visible satellites, including indications of the visible satellites, are transmitted from WAG server 220 to WAG client 240 through base station 230. WAG client 240 uses this information to perform a focused parallel search for GPS signals 14-j. Specifically, the correlators of GPS receiver 280 search for the indicated satellites at the predicted frequencies and code phase search ranges. Thus, the total number of integrations is reduced because the entire frequency spectrum $f_{spec}$ and code phase spectrum $R_f(spec)$ are not being searched, thereby reducing the overall acquisition time.

Although WAG system 200 reduces the number of integrations required by WAG clients 240 to detect GPS signals 14-j, the detection of GPS signals 14-j are not enhanced in environments where GPS signals 14-j have low signal to noise ratios. Thus, longer integrations are still required in low signal to noise environments. Integration times longer than twenty milliseconds in duration may cause GPS receiver sensitivity, i.e. the ability to detect GPS signals 14-j, to degrade. The reason for this degradation is because each bit of navigation data ND-j spans a duration of twenty milliseconds. Integrations longer than twenty milliseconds results in an integration period which includes transitions from one bit navigation data ND-j to another bit, thereby degrading GPS receiver sensitivity.

One way to resolve this problem is to remove the navigation data ND-j from the received GPS signals 14-j prior to integration (e.g., points a and b) or after integration but before processing (e.g., point c) by processor 36. This technique is referred to herein as data or modulation wipeoff.

In the prior art, data wipeoff is performed using previously received navigation data ND-j to remove the navigation data ND-j in currently received GPS signals 14-j. Using previously received navigation data ND-j to perform data wipeoff may result in incomplete removal/wipeoff of current navigation data ND-j because previously received navigation data ND-$j_t$ would not necessarily be identical to current navigation data ND-j. Incomplete data wipeoff introduces bit errors thereby reducing GPS receiver sensitivity which, in turn, necessitates integration times longer in duration than if data wipeoff was complete. Accordingly, there exists a need for a method of enhancing data wipeoff.

SUMMARY OF THE INVENTION

The present invention is a method for enhancing data wipeoff by predicting future navigation data. Data wipeoff using predicted future navigation data reduces or eliminates incomplete data wipeoff, thereby enhancing GPS receiver sensitivity and reducing acquisition times. The present invention method for predicting future navigation data includes receiving navigation data and using the received navigation data to generate predicted future navigation data, wherein the predicted future navigation data should be approximately identical to navigation data received at a future time. The predicted future navigation data is subsequently used to perform data wipeoff. In one embodiment, future navigation data is predicted by predicting a time of week message for a time corresponding to the future navigation data, and subsequently calculating parity bits based on the predicted time of week message and previously received navigation data.

BRIEF DESCRIPTION OF THE DRAWINGS

The features, aspects, and advantages of the present invention will become better understood with regard to the following description, appended claims, and accompanying drawings where:

FIG. 11(a) depicts a parity check algorithm for word two in a subframe;

FIG. 11(b) depicts a continuation of the check algorithm illustrated in FIG. 11(a);

DETAILED DESCRIPTION

Figure 1:
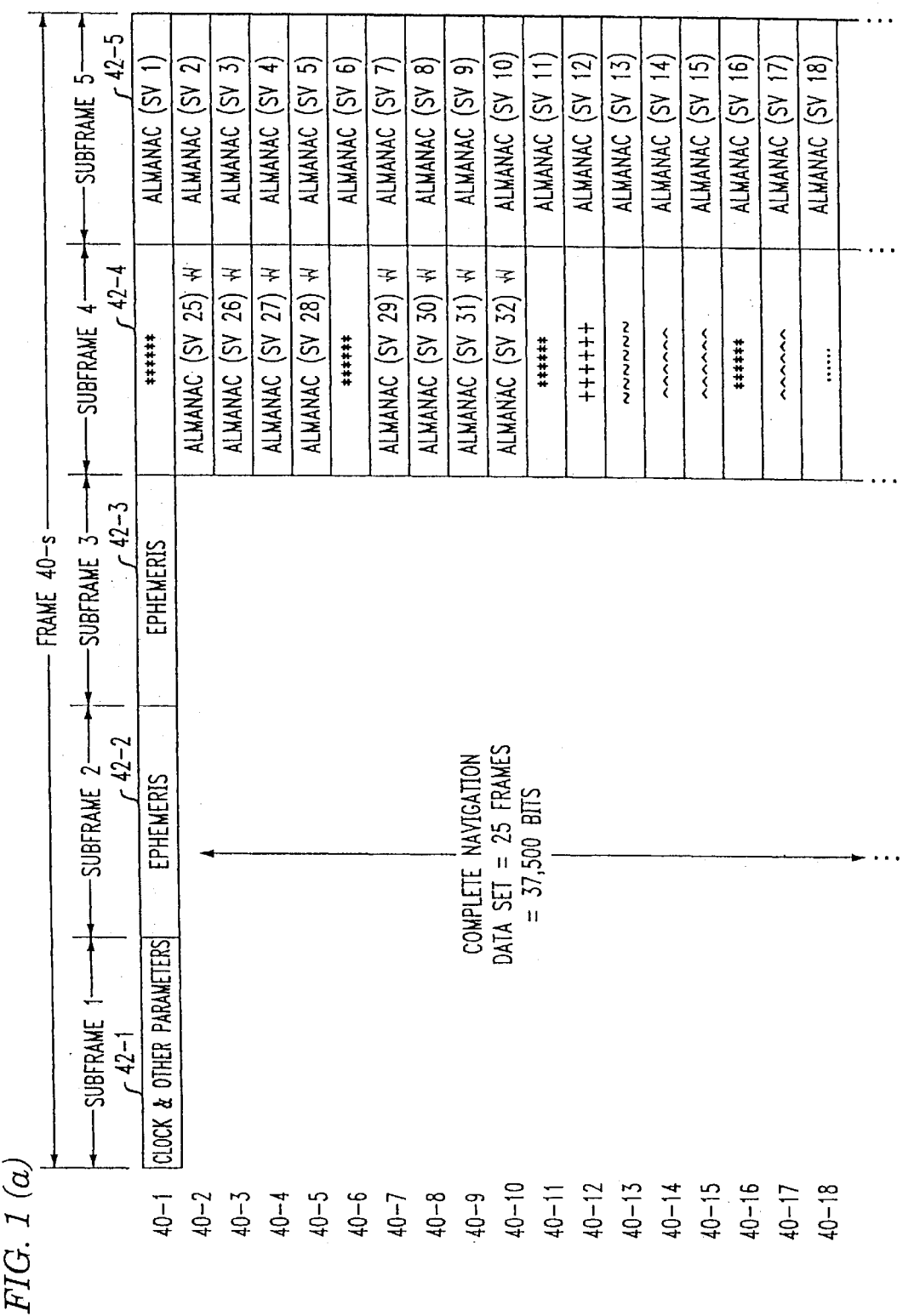
FIG. 1(a) depicts a complete navigation data set.
FIG. 1(b) depicts a continuation of the navigation data set of FIG. 1(a)
Figure 1B:
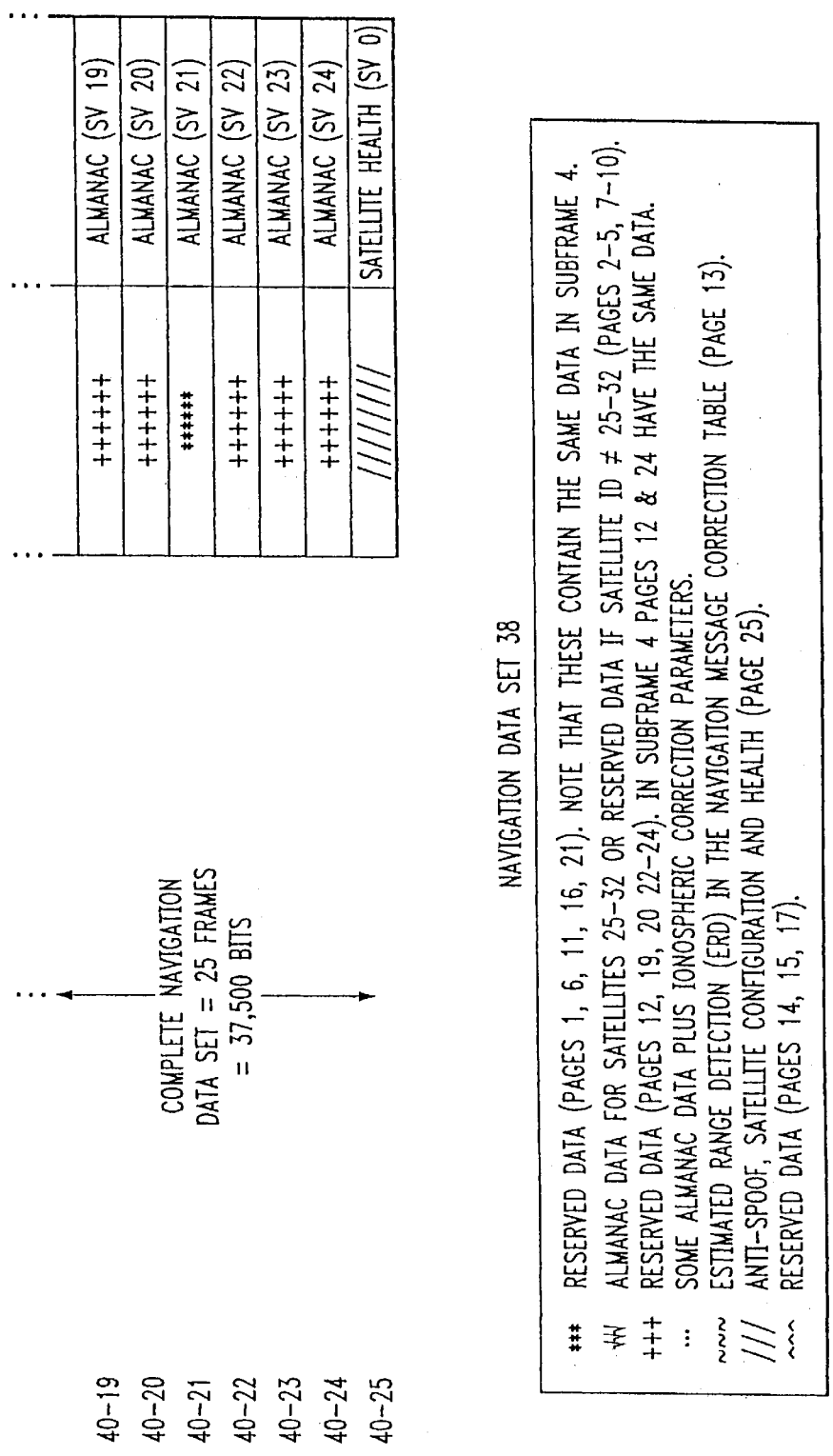
Figure 2:
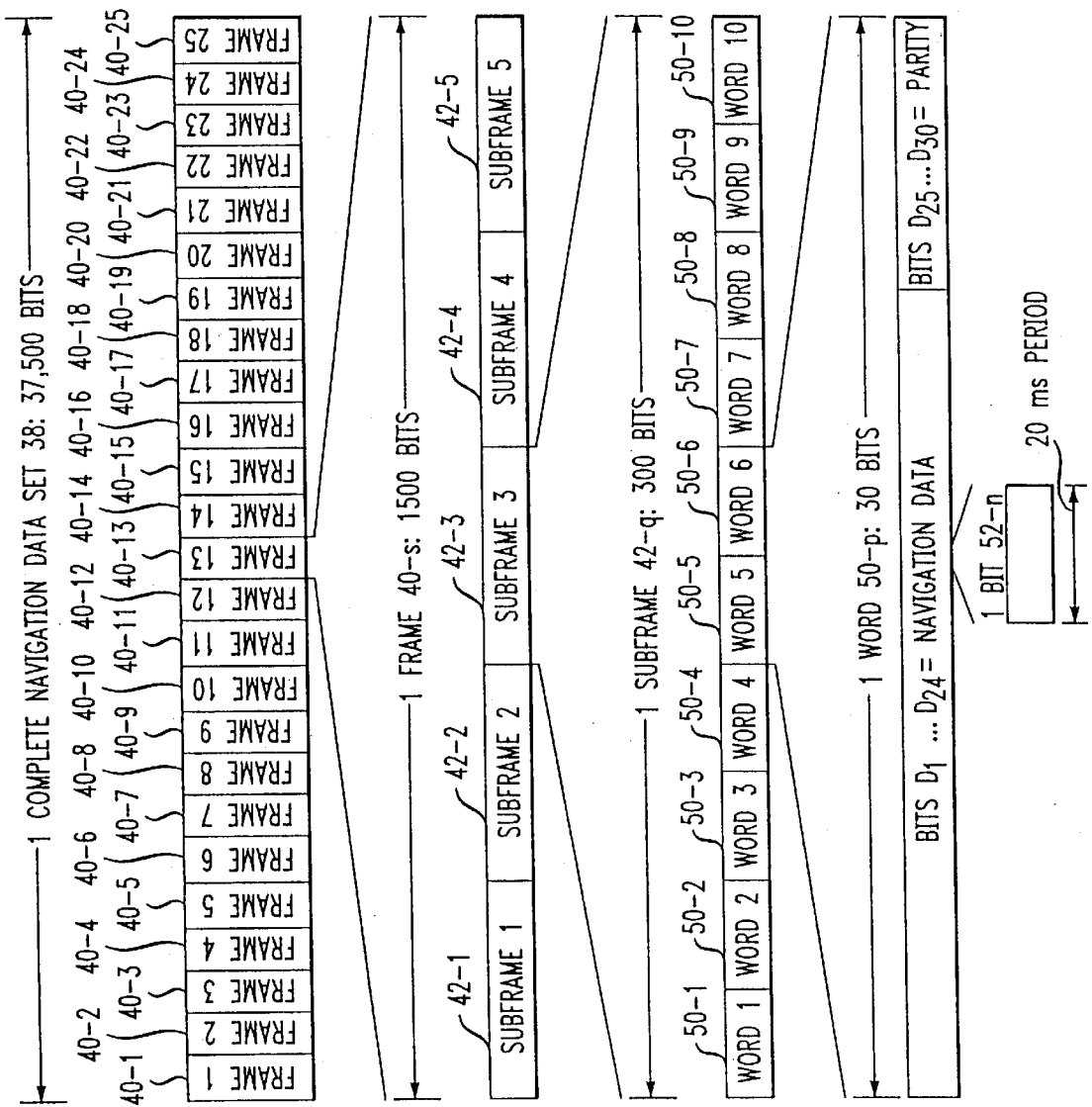
FIG. 2 depicts one frame of navigation data broken into subframes and words.

The present invention is a method of predicting future navigation data for enhancing data wipeoff. Predicting future navigation data requires an understanding of the components which make up navigation data. Navigation data includes navigation data bits and parity bits, wherein navigation data bits comprise a satellite identifier, timing information, satellite health indicators and orbital data, such as ephemeris and almanac information. FIGS. 1(a)–1(b) and 2 depict a high level and a detailed illustration of a complete navigation data set 38, respectively. Navigation data set 38 comprises twenty-five frames 40-s having a total of 37,500 bits, wherein each frame comprises fifteen hundred bits and is transmitted over a thirty-second interval. Thus, all twenty-five frames of navigation data set 38 are sent over a period of twelve and one half minutes. Navigation data set 38 is valid (or does not generally change) for a fixed or non-fixed period (hereinafter referred to as a "data set period"), e.g. two hours. That is, the same basic twenty-five frames of navigation data set 38 are continuously transmitted during a data set period with a few exceptions, as will be described herein.

Each frame 40-s includes five subframes 42-q, wherein each subframe 42-q comprises three hundred bits. Subframe one 42-1 includes parity bits and navigation data bits corresponding to a GPS week number, satellite accuracy and health, and satellite clock correction terms. Subframes two 42-2 and three 42-3 include parity bits and navigation data bits corresponding to ephemeris parameters. Most of the information transmitted over subframes one 42-1, two 42-2 and three 42-3 will not change from frame to frame during a data set period.

Subframe four 42-4 includes parity bits and navigation data bits corresponding to a page of almanac data, special messages, ionospheric, timing data, page ID, satellite configuration and/or reserved data. There are a total of twenty-five such pages to be transmitted over the fourth subframe 42-4, wherein each page is transmitted every twenty-fifth frame. Most of the information comprising each of the twenty five pages transmitted over subframe four 42-4 will not change during a data set period.

Subframe five 42-5 includes parity bits and navigation data bits corresponding to almanac data, satellite health, satellite ID, almanac reference time and/or almanac reference week number. There are a total of twenty-five such pages to be transmitted over subframe five 42-5, wherein each page is transmitted every twenty-fifth frame. Most of the information comprising each of the twenty five pages transmitted over subframe five 42-5 will not change during a data set period.

Each subframe 42-q includes ten words 50-p, wherein each word 50-p comprises thirty bits, as shown in FIG. 2. The twenty-four most significant bits of word 50-p are navigation data bits, and the six least significant bits of word 50-p are parity bits for that word 50-p.

Figure 3:
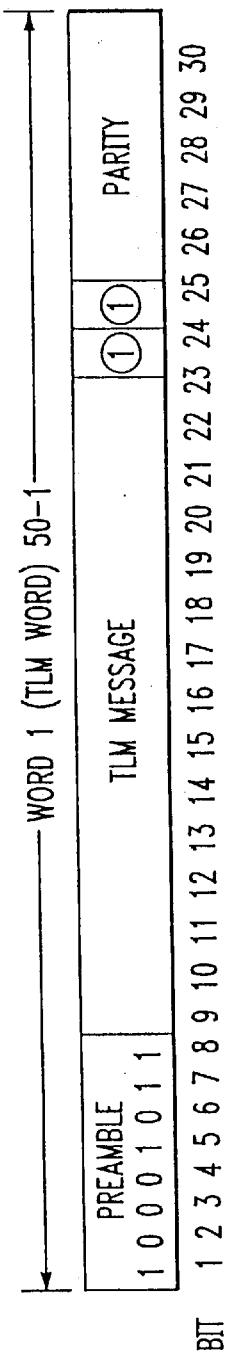
FIGS. 3 and 4 depict the data bits in a Telemetry (TLM) Word and in a Hand Over Work (HOW) for each subframe.

Word one 50-1 of each subframe 42-q is commonly referred to as the telemetry, or TLM word. FIG. 3 depicts TLM word 50-1. TLM word 50-1 comprises six parity bits and twenty four navigation data bits including an eight-bit preamble for identifying a start of a subframe, fourteen bits of a TLM message and two reserved bits. During a data set period, TLM word 50-1 of each subframe 42-q in each frame 40-s will be the same. For example, TLM word 50-1 in subframe one 42-1 of frame 40-1, TLM word 50-1 in subframe four 42-4 of frame 40-1 and TLM word 50-1 in subframe three 42-3 of frame 40-3 are identical during the same data set period. Thus, predicting a future TLM word 50-1 for any subframe 42-q for a data set period involves copying a previous TLM word 50-1 that was transmitted during the same data set period.

Figure 4:
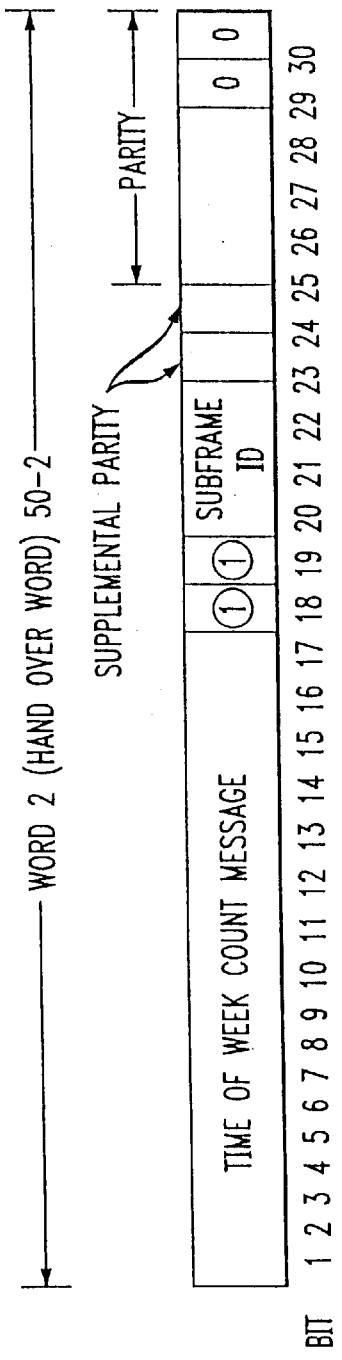

Word two 50-2 of each subframe 42-q is commonly referred to as a Hand Over Word (HOW). FIG. 4 depicts HOW 50-2. HOW 50-2 includes six parity bits and twenty four navigation data bits including most significant bits of a time of week count (TOW) message, two reserved bits, three bits for identifying subframe 42-q (known as a Subframe ID) and two supplemental parity bits, wherein the last two parity bits are always zero. The TOW message increments by one time unit, e.g. six seconds or one bit, per subframe, and provides a time reference to GPS time, wherein the time reference indicates a starting time for an immediately succeeding subframe 42-q and can be converted to a time of week count in GPS time using an appropriate conversion factor (e.g., six seconds per time unit). For example, the TOW message in subframe three 42-3 of a frame 40-1 is found by incrementing the TOW message in subframe two 42-2 of frame 40-1 by one time unit. If each time unit represents six seconds, then the appropriate conversion factor is six seconds per time unit and the time reference can be converted into a time of week count (in GPS time) by multiplying the time reference by six. Because the TOW message increments a time unit every subframe, the parity bits will also change in HOW 50-2 of each subframe 42-q in each frame 40-s to account for the changing TOW message. Thus, predicting a future HOW 50-2 for any subframe 42-q involves incrementing the TOW message of a previous HOW 50-2 a time unit for every subframe from previous HOW 50-2 to and including future HOW 50-2 being predicted, and predicting the parity bits, as will be described herein. Note that the TOW message may be predicted for future subframes 42-q even if such future subframes 42-q will occur after the current data set period.

Words three 50-3 through ten 50-10 of subframe one 42-1 comprise, for each word, six parity bits and twenty four navigation data bits corresponding to a GPS week number, satellite accuracy and health, and/or satellite clock correction terms, including an Issue of Data for Clock (IODC) parameter. Words three 50-3 through ten 50-10 of subframes two 42-2 and three 42-3 comprise, for each word, six parity bits and twenty four navigation data bits corresponding to ephemeris information, such as Issue of Data for Ephemeris (IODE). Like TLM word 50-1, words three 50-3 through ten 50-10 in subframes one 42-1, two 42-2 and three 42-3 do not change from frame to frame during the data set period. But note that words three 50-3 through ten 50-10 in subframes one 42-1, two 42-2 and three 42-3 are not identical to each other. For example, word three 50-3 of subframe one 42-1 in a first frame 40-1 is the same as word three 50-3 of subframe one 42-1 in a second frame 40-2 during a data set period, but word three 50-3 of subframe one 42-1 in the first frame 40-1 is different from word ten 50-10 of subframe 42-1 in the first frame 40-1 or any other subframe in any other frame. Thus, predicting future words three 50-3 through ten 50-10 for subframes one 42-1, two 42-2 and three 42-3 for a data set period involves copying words three 50-3 through ten 50-10 of previous subframes one 42-1, two 42-2 and three 42-3, respectively, transmitted during the same data set period.

Note that the IODC parameter is represented by ten bits in subframe one 42-1. Specifically, the two most significant bits of the IODC parameter are in word three 50-3 of subframe one 42-1 and the eight least significant bits of the IODC parameter are in word eight 50-8 of subframe one 42-1. The IODE parameter is represented in both subframes two 42-2 and three 42-3 by eight bits; that is, the IODE parameter is represented by eight bits in subframe two 42-2 and again by eight identical bits in subframe three 42-3. Specifically, the IODE parameter is in word three 50-3 of subframe two 42-2 and in word ten 50-10 of subframe three 42-3. The eight least significant bits of the IODC parameter are equal to the eight bits of the IODE parameter in subframe two 42-2, which are equal to the eight bits of the IODE parameter in subframe three 42-3, during a data set period.

As shown in back in FIGS. 1(a)–1(b) and 2, words three 50-3 through ten 50-10 of subframe four 42-4 comprise six parity bits and twenty four navigation data bits corresponding to satellite almanac and health data, reserved bits, satellite configuration flags and/or ionospheric data; and words three 50-3 through ten 50-10 of subframe five 42-5 comprise six parity bits and twenty four navigation data corresponding to satellite almanac and health data and/or almanac reference time and week number.

The page of subframe four 42-4 is identified by the page ID parameter, which is located in word three 50-3. By contrast, the page of subframe five 42-5 is identified by the satellite ID parameter, which is located in word three 50-3. During a data set period, words three 50-3 through ten 50-10 of pages one through twenty-five in subframes four 42-4 and five 42-5 do not change (although the words and pages change from subframe to subframe and from frame to frame, respectively). Thus, predicting future words three 50-3 through ten 50-10 for subframes four 42-4 and five 42-5 for a data set period involves copying words three 50-3 through ten 50-10 of subframes four 42-4 and five 42-5, respectively, of a frame transmitted 25x frames earlier during the same data set period, wherein x is an integer.

Thus, if a data set period did not change, a navigation data set to be transmitted by a satellite 12-j during the same data set period can be predicted using a previous navigation data set transmitted during the same data set period by predicting the TOW message and parity bits of word two 50-2, as will be described later herein.

One way to determine whether a data set period has changed, i.e. navigation data set 38 is no longer valid and a new navigation data set issued, is to compare the IODC and IODE parameters. If the IODC and/or IODE parameters changed from one frame to the next frame (or from one subframe to the next subframe), then the data set period has changed. Otherwise, the data set period has not changed. The specific bits being compared are the eight least significant bits of the ten bits corresponding to the IODC parameter in subframe one 42-1, the eight bits corresponding to the IODE parameter in subframe two 42-2 and/or the eight bits corresponding to the IODE parameter in subframe three 42-3. A change in any one of the aforementioned bits signifies a new data set period. For example, the eight least significant bits of IODC in subframe one 42-1 of a current frame 40-2 are compared to the eight least significant bits of IODC in subframe one 42-1 of an immediately preceding frame 40-1. If the eight least significant bits of IODC in current frame 40-2 are not equal to the eight least significant bits of IODC in immediate preceding frame 40-1, then current frame 40-2 is a part of a new data set. Similarly, the IODE parameter in subframe two 42-2 of a current frame can be compared to the IODE parameter in subframe two 42-2 of an immediate preceding frame. If the IODE parameter in subframe two 42-2 of a current frame is not equal to the IODE parameter in subframe two 42-2 of an immediate preceding frame, then the current frame is a part of a new data set. Or, the IODE parameter in subframe three 42-3 of a current frame can be compared to the IODE parameter in subframe three 42-3 of an immediate preceding frame. If the IODE parameter in subframe three 42-3 of the current frame is not equal to the IODE parameter in subframe three 42-3 of the immediate preceding frame, then the current frame is a part of a new data set. Alternatively, the eight least significant bits of the ten bits corresponding to the IODC parameter in subframe one 42-1 are compared to the eight bits corresponding to the IODE parameter in subframe two 42-2 and the eight bits corresponding to the IODE parameter in subframe three 42-3 belonging to the same frame or a different frame.

Based on the above description of navigation data, future navigation data can be predicted for some future time, hereinafter referred to as an "action time," once previous navigation data is available. In other words, the present invention of predicting future navigation data involves receiving navigation data and predicting future navigation data for the action time using the received navigation data. In one embodiment, receiving navigation data involves reception of navigation data, updated stored previously received navigation data with the received navigation data, and predicting future navigation data using the updated stored previously received navigation data. FIGS. 5, 7(a)–7(c), 8 and 10(a)–10(c) are flowcharts illustrating an implementation of this embodiment, and will be described in greater detail herein.

Figure 5:
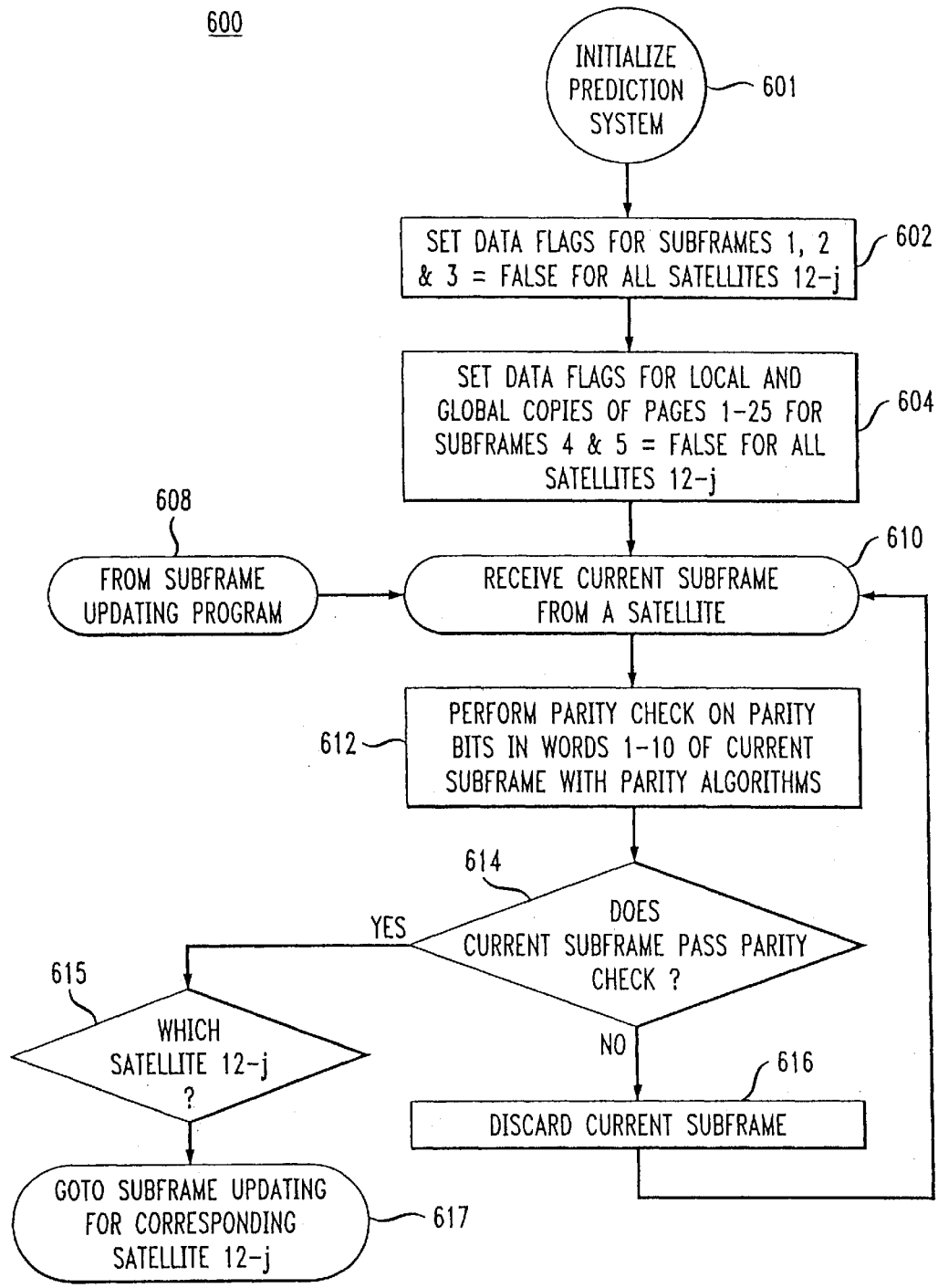
FIG. 5 is a flowchart depicting a receive subframe program.

FIG. 5 is flowchart 600 illustrating a receive subframe program, which is one manner of receiving navigation data ND-j transmitted from a plurality of satellites 12-j. The receive subframe program performs initialization, subframe reception, parity checking and satellite identification. Initialization is performed during steps 601 to 604. In step 601, the receive subframe program is initiated. In step 602, subframe data flags for subframes one 42-1, two 42-2, and three 42-3 are set to false for each satellite 12-j. A false subframe data flag indicates system initialization of navigation data for the associated subframe, and prediction of associated future subframes is not currently possible. By contrast, a true subframe data flag indicates that system initialization of the associated subframe is complete and prediction of associated future subframes is currently possible.

In step 604, local and global data flags for local and global copies of pages one to twenty five for subframes four 42-4 and five 42-5 are set to false for each satellite 12-j. Local and global copies will be described later herein. A false local or global data flag for a local or global copy of a page indicates system initialization of navigation data for the associated page, and prediction of associated future pages is not currently possible. By contrast, a true local or global data flag for a local or global copy of a page indicates that system initialization of the associated page is complete and prediction of associated future pages is currently possible.

Subframe reception is performed in step 610. Subframe reception may occur after step 604, after step 616, or after step 608 (when the receive subframe program returns from a subframe updating program). In step 610, current subframe 42-q is received from satellite 12-j transmitting GPS signal 14-j. Alternatively, step 610 could receive, instead of a complete subframe, one word at a time or even a bit stream of navigation data ND-j.

Figure 6:
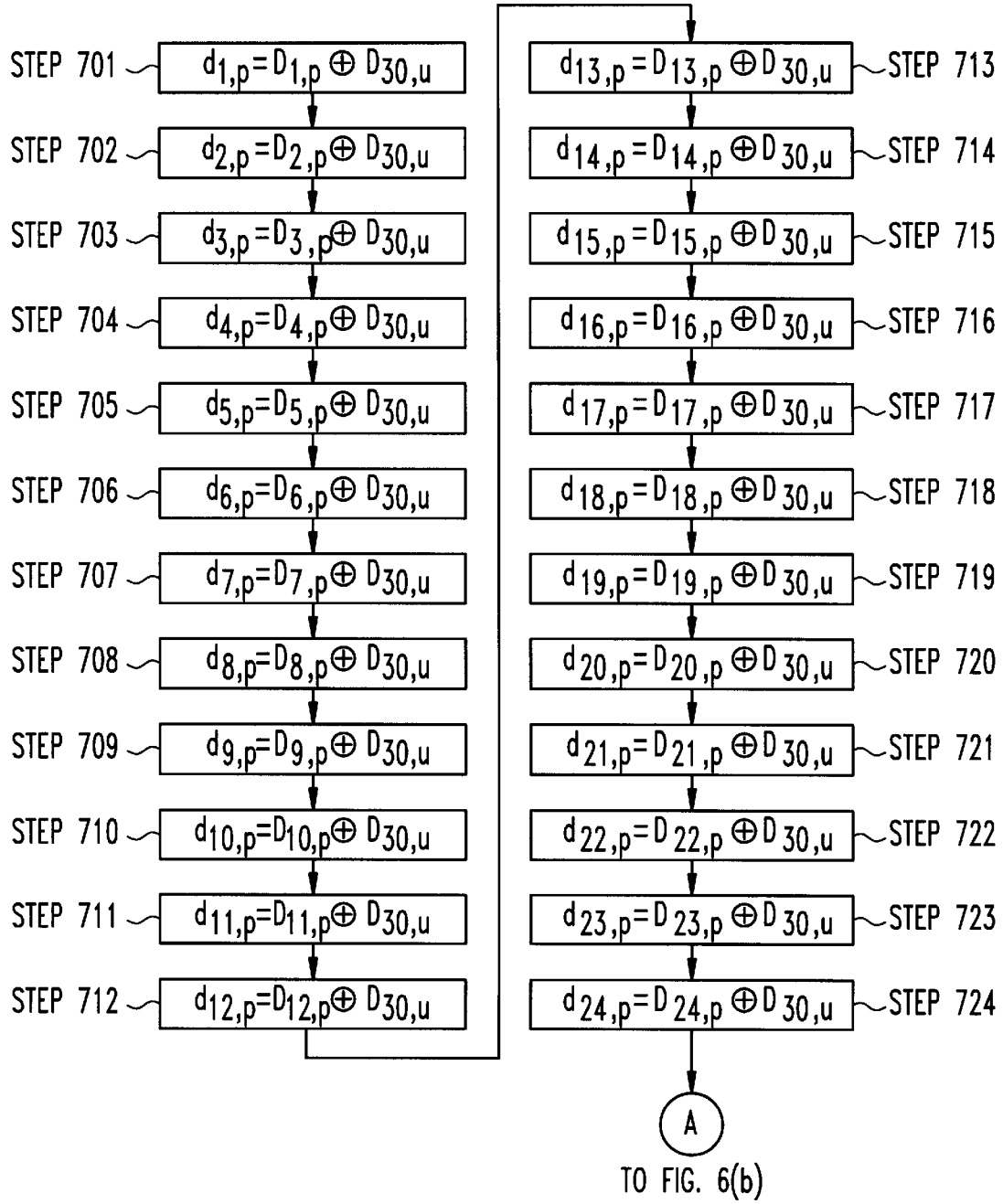
FIG. 6(a) depicts a parity check algorithm for a word in a subframe.
FIG. 6(b) depicts a continuation of the check algorithm illustrated in FIG. 6(a)
Figure 7:
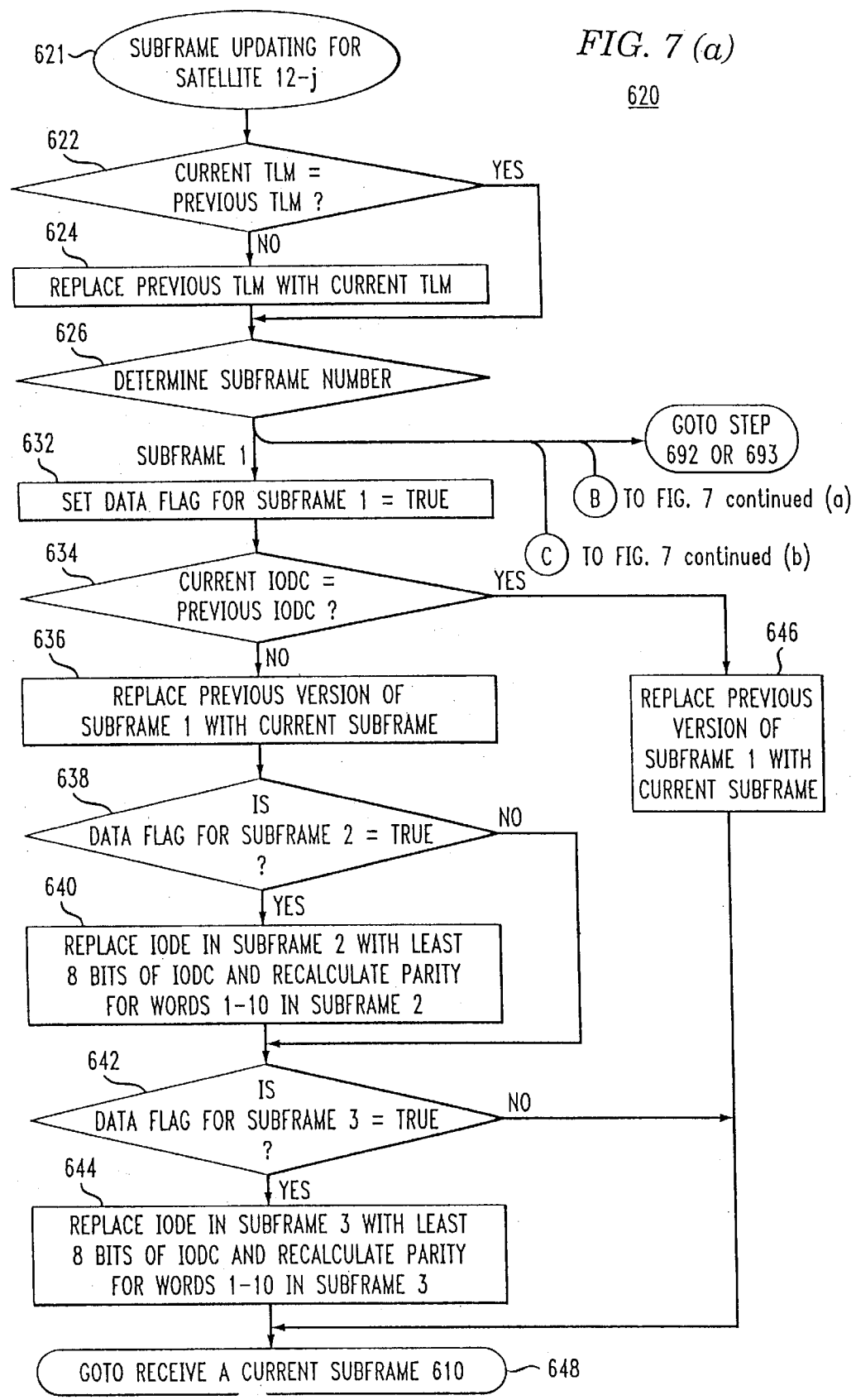
FIGS. 7(a)–7(c) depict a flowchart depicting a subframe updating algorithm.
Figure 7B:
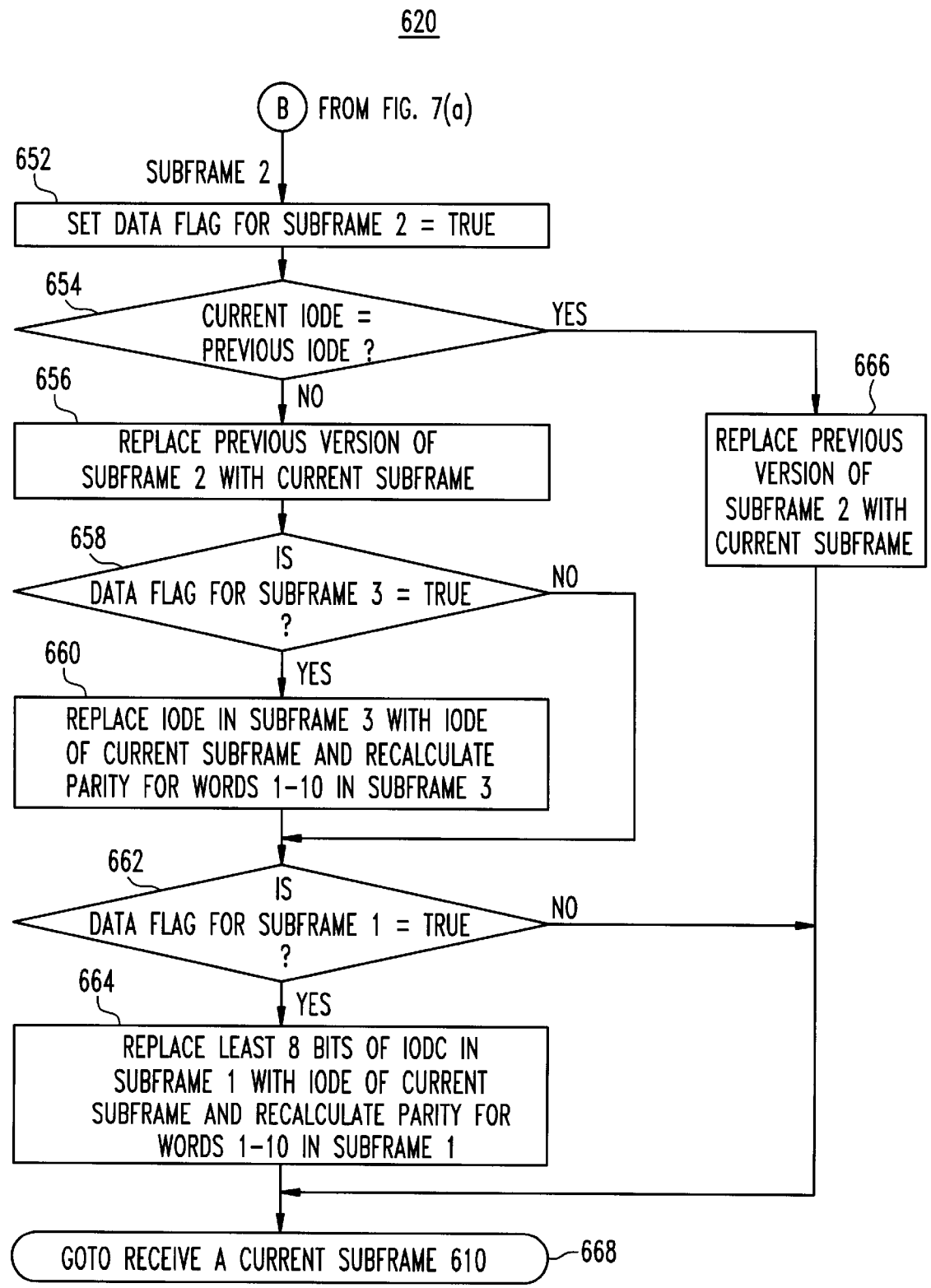
Figure 7C:
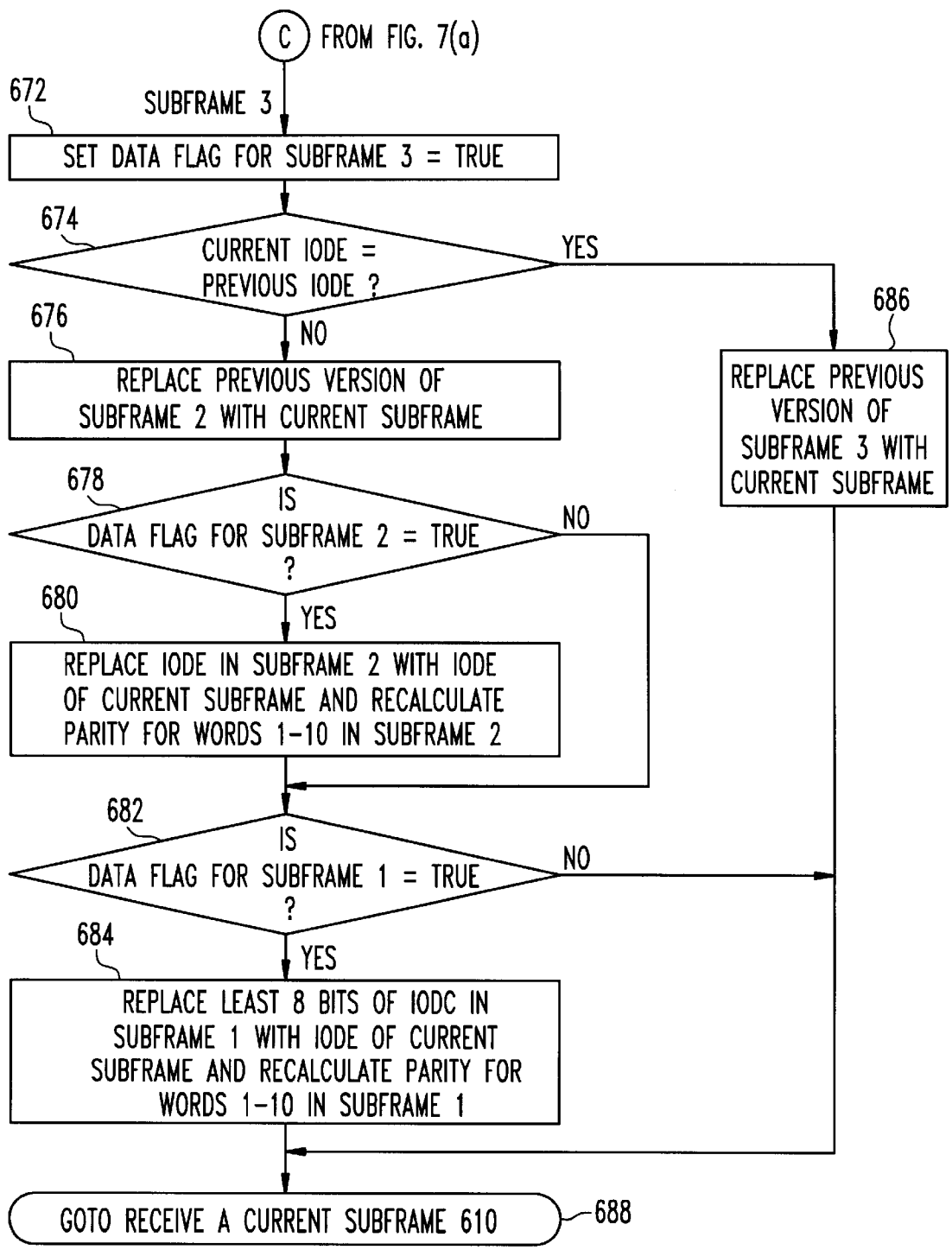
Figure 8:
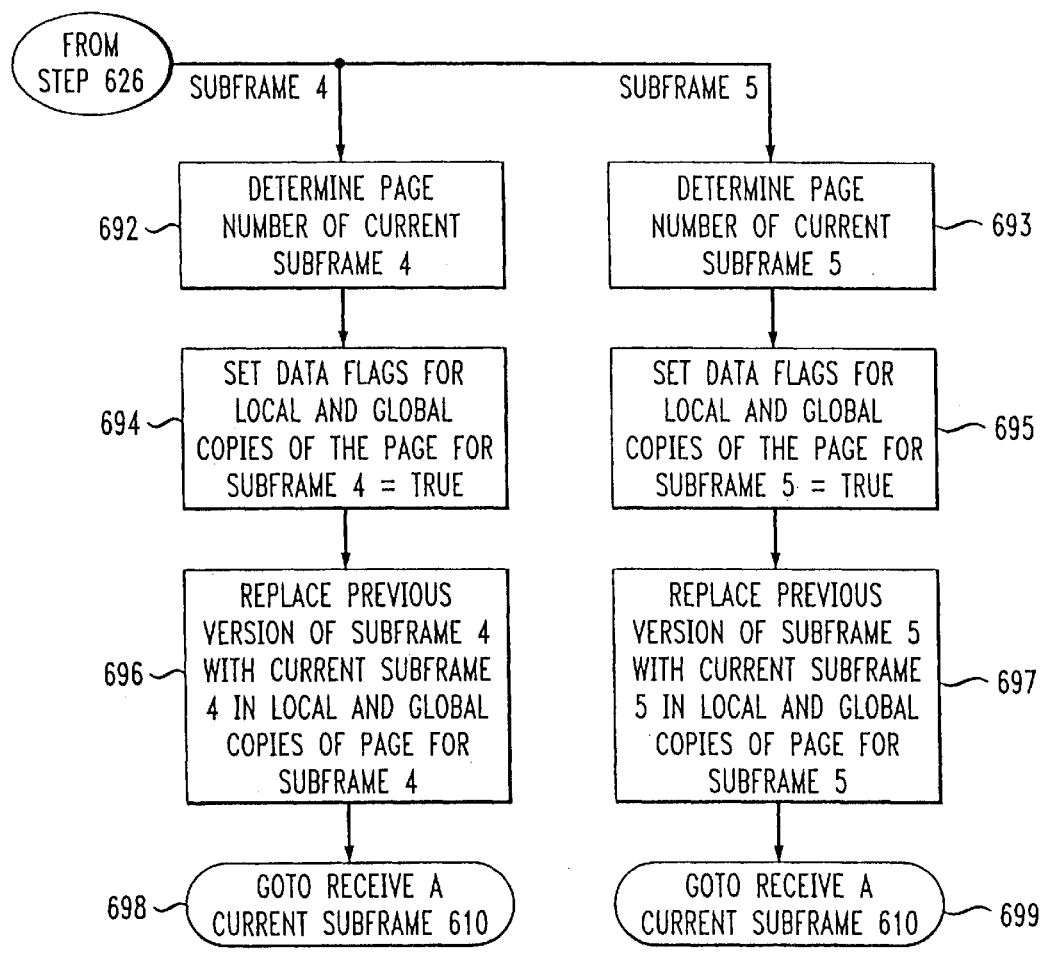
FIG. 8 depicts a flowchart depicting a subframe updating algorithm.

Parity checking is performed in steps 612 to 616. Step 612 checks parity for current subframe 42-q, i.e. parity for each word in subframe 42-q, employing a parity algorithm. FIG. 6 depicts a flowchart 700 of a parity algorithm used in accordance with one embodiment of the present invention for performing parity check on word 50-p. The parity algorithm shows how the six parity bits in word 50-p are derived from modulo-two combinations of navigation data bits for word 50-p and the last two parity bits from an immediately preceding word 50-u, where u=p−1 for p>1 and u=10 for p=1. For ease of discussion, specific bits will hereinafter be referenced using the following nomenclature $D_{bit,word}$, where "bit" and "word" corresponds to a specific bit and word. For example, bit $D_{1,p}$ references the first bit in word 50-p.

In step 701, a modulo two sum operation is performed between received navigation bit $D_{1,p}$ and received parity bit $D_{30,u}$, i.e., between the received first navigation data bit for word 50-p and the received last parity bit (or thirtieth bit) of word 50-u. The modulo two sum of $D_{1,p}$ and $D_{30,u}$ is represented by $d_{1,p}$. Likewise, in steps 702 . . . 724, modulo two sum operations are performed between the received next navigation data bit (i.e. $D_{2,p}$, $D_{3,p}$, . . . $D_{24,p}$) and parity bit $D_{30,u}$ to obtain the modulo two sums (i.e. $d_{2,p}$, $d_{3,p}$, . . . $d_{24,p}$).

Once $d_{1,p}$ . . . $d_{24,p}$ are determined, parity bits $D_{25,p}$ . . . $D_{30,p}$ are calculated for word 50-p. In step 725, modulo two sum operations are performed between $d_{1,p}$, $d_{2,p}$, $d_{3,p}$, $d_{5,p}$, $d_{6,p}$, $d_{10,p}$, $d_{11,p}$, $d_{12,p}$, $d_{13,p}$, $d_{14,p}$, $d_{17,p}$, $d_{18,p}$, $d_{20,p}$, $d_{23,p}$ and parity bit $D_{29,u}$ to obtain parity bit $D_{25,p}$. In step 726, modulo two sum operations are performed between $d_{2,p}$, $d_{3,p}$, $d_{4,p}$, $d_{6,p}$, $d_{7,p}$, $d_{11,p}$, $d_{12,p}$, $d_{13,p}$, $d_{14,p}$, $d_{15,p}$, $d_{18,p}$, $d_{19,p}$, $d_{21,p}$, $d_{24,p}$ and parity bit $D_{30,u}$ to obtain parity bit $D_{26,p}$. In step 727, modulo two sum operations are performed between $d_{1,p}$, $d_{3,p}$, $d_{4,p}$, $d_{5,p}$, $d_{7,p}$, $d_{8,p}$, $d_{12,p}$, $d_{13,p}$, $d_{14,p}$, $d_{15,p}$, $d_{16,p}$, $d_{19,p}$, $d_{20,p}$, $d_{22,p}$ and parity bit $D_{29,u}$ to obtain parity bit $D_{27,p}$. In step 728, modulo two sum operations are performed between $d_{2,p}$, $d_{4,p}$, $d_{5,p}$, $d_{6,p}$, $d_{8,p}$, $d_{9,p}$, $d_{13,p}$, $d_{14,p}$, $d_{15,p}$, $d_{16,p}$, $d_{17,p}$, $d_{20,p}$, $d_{21,p}$, $d_{23,p}$ and parity bit $D_{30,u}$ to obtain parity bit $D_{28,p}$. In step 729, modulo two sum operations are performed between $d_{1,p}$, $d_{3,p}$, $d_{5,p}$, $d_{6,p}$, $d_{7,p}$, $d_{9,p}$, $d_{10,p}$, $d_{14,p}$, $d_{15,p}$, $d_{16,p}$, $d_{17,p}$, $d_{18,p}$, $d_{21,p}$, $d_{22,p}$, $d_{24,p}$ and parity bit $D_{30,u}$ to obtain parity bit $D_{29,p}$. In step 730, modulo two sum operations are performed between $d_{3,p}$, $d_{5,p}$, $d_{6,p}$, $d_{8,p}$, $d_{9,p}$, $d_{10,p}$, $d_{11,p}$, $d_{13,p}$, $d_{15,p}$, $d_{19,p}$, $d_{22,p}$, $d_{23,p}$, $d_{24,p}$ and parity bit $D_{29,u}$ to obtain bit $D_{30,p}$. The calculated parity bits $D_{25,p}$ . . . $D_{30,p}$ (from steps 725 to 730) are compared to received parity bits $D_{25,p}$ . . . $D_{30,p}$ (i.e., parity bits received along with received navigation bits $D_{1,p}$ . . . $D_{24,p}$) for word 50-p in the currently received subframe. Any difference between the calculated parity bits and received parity bits signifies associated received word 50-p (and thus subframe 42-q) has failed the parity check. Note that other parity algorithms are possible so long as the other parity algorithms would, if given the same bits from which to calculate parity bits, e.g. navigation data bits of current word and last two parity bits of preceding word, calculate identical parity bits.

Returning to FIG. 5, in step 614, if the calculated parity bits are not equal to received parity bits for any word 50-p, then word 50-p fails the parity check. Failed parity checks for any word 50-p in current subframe 42-q results in current subframe 42-q being discarded in step 616 before returning to step 610 in order to receive a next subframe 42-q. If current subframe 42-q passes parity check (i.e., all words 50-p in current subframe 42-q pass parity check), then satellite 12-j to which current subframe 42-q belongs is identified in step 615, for example, based on PN-j codes or the satellite ID parameter. Step 617 proceeds to updating previously received navigation data (hereinafter referred to as "subframe updating") for the identified satellite 12-j.

Subframe updating is a process where navigation data ND-j (stored in computer memory) is kept as current as possible so that predictions are based on the best or most up-to-date information available. FIGS. 7(a)–7(c) and 8 depict flowchart 620 illustrating a subframe updating program for satellite 12-j. In step 621, subframe updating is initialized for satellite 12-j using received current subframe 42-q (from step 617 in flowchart 600 of FIG. 5). In step 622, it is determined whether current TLM word 50-1 (i.e. TLM word 50-1 in current subframe 42-q) is equal to previous TLM word 50-1 (i.e. TLM word 50-1 in a previous subframe 42-q), if any. If current TLM word 50-1 is not equal to previous TLM word 50-1 (as would be the case upon initialization), then previous TLM word 50-1 is replaced by current TLM word 50-1, in step 624.

After replacing previous TLM word 50-1, or when current TLM word 50-1 is equal to previous TLM word one 50-1, in step 626, the subframe number is determined for the current subframe by checking the three-bit Subframe ID in word two 50-2 to begin the process of updating the appropriate subframe. If the Subframe ID identifies the current subframe as subframe one 42-1, two 42-3, three 42-3, four 42-4 or five 42-5, then the next step is 632, 652, 672, 692 or 693, respectively.

Step 632 begins the process of updating subframe one. In step 632, the subframe data flag for subframe one 42-1 is set to true, indicating there is enough information to predict future versions of subframe one 42-1. In step 634, a current IODC parameter (i.e. IODC parameter in current subframe one 42-1) is compared with a previous IODC parameter (i.e. IODC parameter in a previous subframe one 42-1). If the current IODC parameter is equal to the previous IODC parameter, then previous subframe one 42-1, if any, is replaced by current subframe one 42-1, in step 646, for purposes of updating the TOW message in word two 50-2. Note that step 646 is not necessary as long as the number of frames or subframes between current subframe one 42-1 and previous subframe one 42-1 are known, thereby enabling the TOW message to be updated or calculated. After step 646, step 648 returns to subframe reception for the next subframe 42-q (in step 610 of flowchart 600).

If the current IODC parameter is not equal to the previous IODC parameter (as in the case of initialization or when the data set period changed), then previous subframe one 42-1 is still replaced with current subframe one 42-1, in step 636, in order to update subframe one 42-1 to the new data set. In step 638, the subframe data flag for subframe two 42-2 is checked. If the subframe data flag for subframe two 42-2 is true, (indicating there is enough information to predict future versions of subframe two 42-2) the next step is 640, where a previous IODE parameter for subframe two 42-2, if any, is replaced by the eight least significant bits of the IODC parameter from current subframe one 42-1 in order to keep the IODE parameter for subframe two 42-2 as current as possible prior to receiving the next subframe two 42-2 (i.e., subframe two 42-2 of new data set). Once the IODE parameter in subframe two 42-2 is updated, all words 50-p in subframe two 42-2 have their parity bits recomputed using a parity algorithm, such as parity algorithm 700 of FIGS. 6(*a*)–6(*b*).

Upon completion of step 640 or if the subframe data flag for subframe two 42-2 is false (indicating there is not enough information to predict future versions of subframe two 42-2), in step 642, the subframe data flag for subframe three 42-3 is checked. If the subframe data flag for subframe three 42-3 is true indicating there is enough information to predict future versions of subframe three 42-3 then, in step 644, an IODE parameter for subframe three 42-3, if any, is replaced by the eight least significant bits of the IODC parameter from current subframe one 42-1 in order to keep the IODE parameter for subframe three 42-3 as current as possible prior to receiving the next subframe three 42-3 (i.e., subframe three 42-3 of new data set). Once the IODE parameter in subframe three 42-3 is updated, all words 50-p in subframe three 42-3 have their parity bits recomputed using the parity algorithm. Upon completion of step 644, or when the subframe data flag for subframe three 42-3 is false indicating there is not enough information to predict future versions of subframe three 42-3, the next step is 648, which returns to step 610 of subframe reception in flowchart 600.

Note that steps 638 through 644 are optional steps for updating subframes two 42-2 and three 42-3 after the data set period has changed by replacing the IODE parameter and recalculating the parity bits based on stored navigation data for subframes two 42-2 and three 42-3 and the new IODC parameter. That is, after steps 640 and 644 are executed, the updated navigation data bits and parity bits stored in computer memory for subframes two 42-2 and three 42-3 comprise navigation data bits from previously received subframes two 42-2 and three 42-3 in which the IODE parameter has been replaced with the current eight least significant bits of the IODC parameter in the currently received subframe one 42-1 (i.e. updated navigation data bits) and re-calculated parity bits based on the updated navigation data bits.

Step 652 begins the process of updating subframe two 42-2. In step 652, the data flag for subframe two 42-2 is set to true, indicating there is enough information to predict future versions of subframe two 42-2. In step 654, a current IODE parameter (i.e. IODE parameter in current subframe two 42-2) is compared with a previous IODE parameter (i.e. IODE parameter in a previous subframe two 42-2). If the current lODE parameter is equal to the previous IODE parameter, then previous subframe two 42-2, if any, is replaced by current subframe two 42-2, in step 666, for purposes of updating the TOW message in word two 50-2. Note that step 666 is not necessary as long as the number of frames or subframes between current subframe two 42-2 and previous subframe two 42-2 are known, thereby enabling the TOW message to be updated or calculated. After step 666, step 668 returns to subframe reception for the next subframe 42-q (in step 610 of flowchart 600).

If the current IODE parameter is not equal to the previous IODE parameter (as in the case of initialization or when the data set period changed) then previous subframe two 42-2 is still replaced with current subframe two 42-2, in step 656, in order to update subframe two 42-2 to the new data set. In step 658, the subframe data flag for subframe three 42-3 is checked. If the subframe data flag for subframe three 42-3 is true (indicating there is enough information to predict future versions of subframe three 42-3) the next step is 660, where the previous IODE parameter for subframe three 42-3, if any, is replaced by the IODE parameter from current subframe two 42-2 in order to keep the IODE parameter for subframe three 42-3 as current as possible prior to receiving the next subframe three 42-3. Once the IODE parameter in subframe three 42-3 is updated, all words 50-p in subframe three 42-3 have their parity bits recomputed using the parity algorithm.

Upon completion of step 660 or if the subframe data flag for subframe three 42-3 is false (indicating there is not enough information to predict future versions of subframe three 42-3), in step 662, the subframe data flag for subframe one 42-1 is checked. If the subframe data flag for subframe one 42-1 is true indicating there is enough information to predict future versions of subframe one 42-1, then in step 664 the eight least significant bits of IODC in subframe one 42-1 are replaced by the IODE parameter from current subframe two 42-2 in order to keep the IODC parameter for subframe one 42-1 as current as possible prior to receiving the next subframe one 42-1. Once the eight least significant bits of IODC in subframe one 42-1 are updated, all words 50-p in subframe one 42-1 have their parity bits recomputed using the parity algorithm. Upon completion of step 664, or when the subframe data flag for subframe one 42-1 is false indicating there is not enough information to predict future versions of subframe one 42-1, the next step is 668, which returns to step 610 of subframe reception in flowchart 600.

Note that steps 658 through 664 are optional steps for updating subframes one 42-1 and three 42-3 after the data set period has changed by replacing the IODC parameter in subframe one 42-1 and the IODE parameter in subframe three 42-3 and recalculating the parity bits based on stored navigation data for subframes one 42-1 and three 42-3 and the new IODE parameter. That is, after steps 660 and 664 are executed, the updated navigation data bits and parity bits stored in computer memory for subframes one 42-1 and three 42-3 comprise navigation data bits from previously received subframes one 42-1 and three 42-3 in which the IODC and IODE parameters have been replaced with the current eight least significant bits of the IODE parameter in the currently received subframe two 42-2 (i.e. updated navigation data bits) and re-calculated parity bits based on the updated navigation data bits.

Step 672 begins the process of updating subframe three. In step 672, the subframe data flag for subframe three 42-3 is set to true, indicating there is enough information to predict future versions of subframe three 42-3. Step 674 compares a current IODE parameter (i.e. lODE parameter in current subframe three 42-3) with a previous IODE parameter (i.e. lODE parameter in a previous subframe three 42-3). If the current IODE parameter is equal to the previous IODE parameter, then previous subframe three 42-3 is replaced by current subframe three 42-3, in step 686, for purposes of updating the TOW message in word two 52-2. Note that step 686 is not necessary as long as the number of frames or subframes between current subframe three 42-3 and previous subframe three 42-3 are known, thereby enabling the TOW message to be updated or calculated. After step 686, step 688 returns to subframe reception for the next subframe (in step 610 of flowchart 600).

If the current IODE parameter in current subframe three 42-3 is not equal to the previous IODC parameter in previous subframe three 42-3 (as in the case of initialization or when the data set period changed), then previous subframe three 42-3 is still replaced with current subframe three 42-3, in step 676, in order to update subframe three 42-3 to the new data set. In step 678, the subframe data flag for subframe two 42-2 is checked. If the subframe data flag for subframe two 42-2 is true (indicating there is enough information to predict future versions of subframe two 42-2) the next step is 680, where the previous IODE parameter for subframe two 42-2, if any, is replaced by the IODE parameter from current subframe three 42-3 in order to keep the IODE parameter for subframe two 42-2 as current as possible prior to receiving the next subframe two 42-2. Once the IODE parameter in subframe two 42-2 is updated, all words 50-p in subframe two 42-2 have their parity bits recomputed using the parity algorithm.

Upon completion of step 680 or if the subframe data flag for subframe two 42-2 is false (indicating there is not enough information to predict future versions of subframe two 42-2), in step 682, the data flag for subframe one 42-1 is checked. If the subframe data flag for subframe one 42-1 is true indicating there is enough information to predict future versions of subframe one 42-1, then in optional step 684 the eight least significant bits of IODC in subframe one 42-1 are replaced by the IODE parameter from current subframe three 42-3 in order to keep the IODC parameter in subframe one 42-1 as current as possible prior to receiving the next subframe one 42-1. Once the eight least significant bits of IODC in subframe one 42-1 are updated, all words in subframe one 42-1 have their parity bits recomputed using the parity algorithm. Upon completion of step 684, or when the subframe data flag for subframe one 42-1 is false, indicating there is not enough information to predict future versions of subframe one 42-1, the next step is 688, which returns to step 610 of subframe reception in flowchart 600.

Note that steps 678 through 684 are optional steps for updating subframes one 42-1 and two 42-2 after the data set period has changed by replacing the IODC parameter in subframe one 42-1 and the IODE parameter in subframe two 42-2 and recalculating the parity bits based on stored navigation data for subframes one 42-1 and two 42-2 and the new IODE parameter. That is, after steps 680 and 684 are executed, the updated navigation data bits and parity bits stored in computer memory for subframes one 42-1 and two 42-2 comprise navigation data bits from previously received subframes one 42-1 and two 42-2 in which the IODC and IODE parameters have been replaced with the current eight least significant bits of the IODE parameter in the currently received subframe three 42-3 (i.e. updated navigation data bits) and re-calculated parity bits based on the updated navigation data bits.

Step 692 begins the process of updating subframe four 42-4. Updating subframe four 42-4, as well as updating subframe five 42-5, involves updating local and global copies of pages one to twenty five for purposes of facilitating prediction of pages one to twenty five. For each satellite 12-j in the visible set, copies of pages one to twenty five for subframes four 42-4 and five 42-5 are maintained. Such copies are the "local copies." Global copies are derived from the local copies. Specifically, the global copies of pages one to twenty five for subframes four 42-4 and five 42-5 are copies of the most current local copies of pages one to twenty five for subframes four 42-4 and five 42-5 for all the satellites in the visible set. For example, if the local copy of page three for subframe four 42-4 for satellite 12-3 in the visible set is the most current local copy of page three for subframe four 42-4 for any satellite 12-j in the visible set, the local copy of page three for subframe four 42-4 is included in the global copies as page three for subframe four 42-4 for all satellites 12-j in the visible set.

The local copies for a particular satellite 12-j are created when that satellite 12-j joins or becomes part of the visible set. The global copies are created when the first local copies are created. The global copies may be updated whenever a page belonging to a satellite 12-j in the visible set is received or some other time thereafter.

Returning to step 692, the page of current subframe four 42-4 is identified using the page ID parameter in word three 50-3 of subframe four 4-24. In step 694, local and global data flags for the identified page of subframe four 42-4 are set equal to true indicating there is enough information to predict future versions of that page of subframe four 42-4. In step 696, local and global copies of the identified page of previous subframe four 42-4, if any, are replaced with the page of current subframe four 42-4. Note that subframe four 42-4 does not have an IODC or IODE parameter to check, and subframe four 42-4 is merely replaced regardless of whether the data set period has changed. Note that, alternatively, step 696 may be eliminated if the data set period did not change (using the IODC or IODE parameter in subframes one 42-1, two 42-2 or three 42-3 to determine if the data set period changed) and if the local and global data flags for the identified page were false prior to step 694. Step 698 returns to step 610 of subframe reception in flowchart 600.

Step 693 begins the process of updating subframe five 42-5. In step 693, the page of current subframe five 42-5 is identified using the satellite ID parameter in word three 50-3 of subframe five 42-5. For instance, if the satellite ID parameter is equal to ten, then the page of subframe five 42-5 is ten. In step 695, local and global data flags for the identified page of subframe five 42-5 are set equal to true, indicating there is enough information to predict future versions of that page of subframe five 42-5. In step 697, local and global copies of the identified page of previous subframe five 42-5, if any, are replaced with the page of current subframe five 42-5. Note that subframe five 42-5 does not have an IODC or IODE parameter to check, and subframe five 42-5 is merely replaced regardless of whether the data set period has changed. Note that, alternatively, step 697 may be eliminated if the data set period did not change (using the IODC or IODE parameter in subframes one 42-1, two 42-2 or three 42-3 to determine if the data set period changed) and if the local and global data flags for local and global copies of the identified page were false prior to step 695. Step 699 returns to step 610 of subframe reception in flowchart 600.

The data collected via the receive subframe program and the subframe updating program is used to predict future navigation data. The present invention is capable of predicting any size segments of future navigation data if the appropriate navigation data has been received. For example, the present invention may predict subframes, words or bit streams of future navigation data. For illustrative purposes, the present invention will be described herein with respect to predicting subframes of future navigation data (hereinafter referred to as "subframe prediction"). This should not be construed to limit the present invention in any manner.

Subframe prediction involves first determining which subframe(s) is to be predicted for which satellite 12-j. If there is enough data to perform prediction (i.e. data flag(s) is set to true for that subframe for satellite 12-j), then words one 50-1 through ten 50-10 can be predicted for that subframe 42-q.

Figure 9:
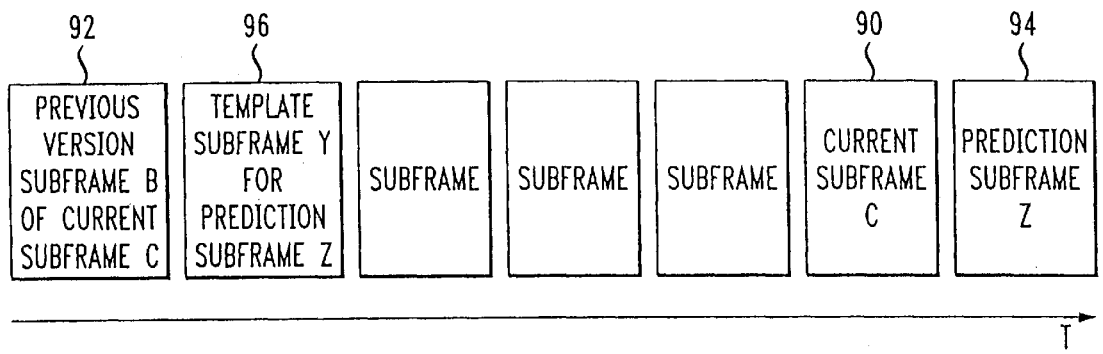
FIG. 9 depicts the relationship between a current subframe and a prediction subframe.

In one embodiment, the present invention predicts a future subframe (hereinafter referred to as a "prediction subframe") using a current subframe (e.g. currently received subframe), a previous version of the current subframe (hereinafter referred to as a "previous version subframe"), and a previous version of the subframe to be predicted (hereinafter referred to as a "template subframe"). FIG. 9 depicts an example illustrating the relationships between the aforementioned subframes. In FIG. 9, subframe 90 is current subframe C; subframe 92 is previous version subframe B; subframe 96 is template subframe Y; and subframe 94 is prediction subframe Z. For example, if prediction subframe Z is subframe four 42-4, then template subframe Y is a previously received subframe four 42-4; if current subframe C is subframe three 42-3, then previous version subframe B is a previously received subframe three 42-3. It should be understood that the prediction subframe does not have to be the immediately succeeding subframe of current subframe C.

Figure 10A:
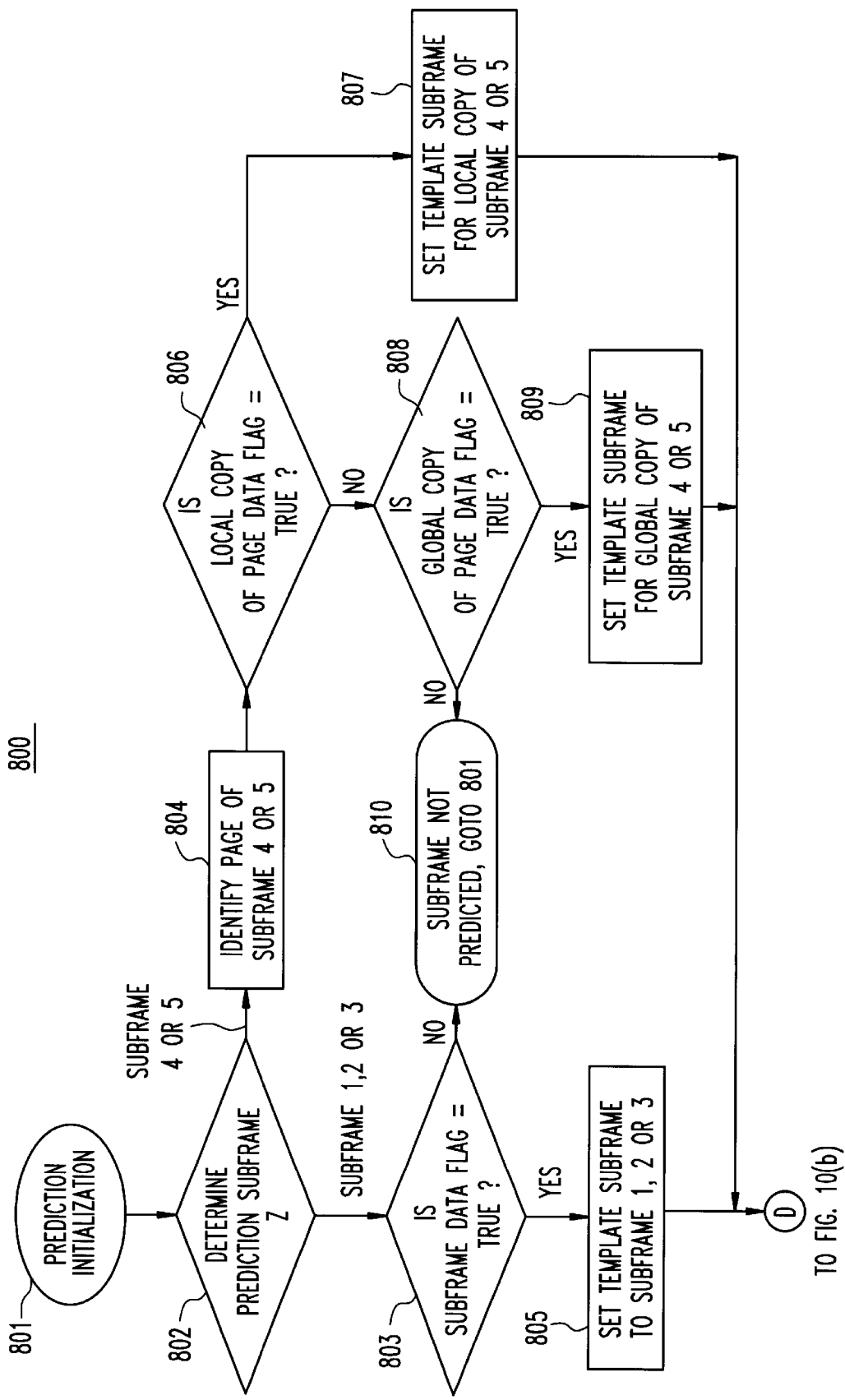
FIGS. 10(a)–10(c) depict a flowchart 800, showing a subframe prediction algorithm.
Figure 10B:
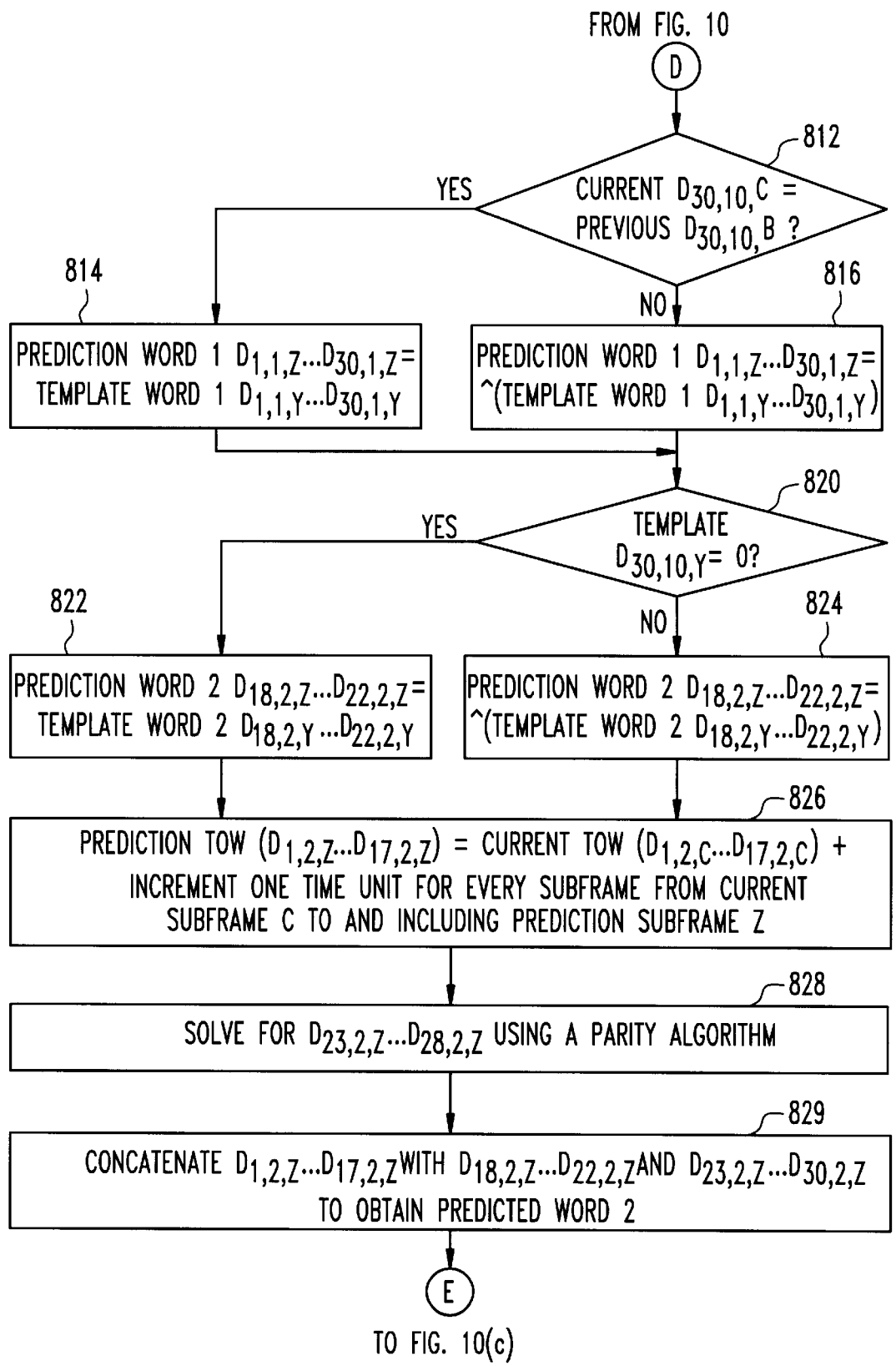
Figure 10C:
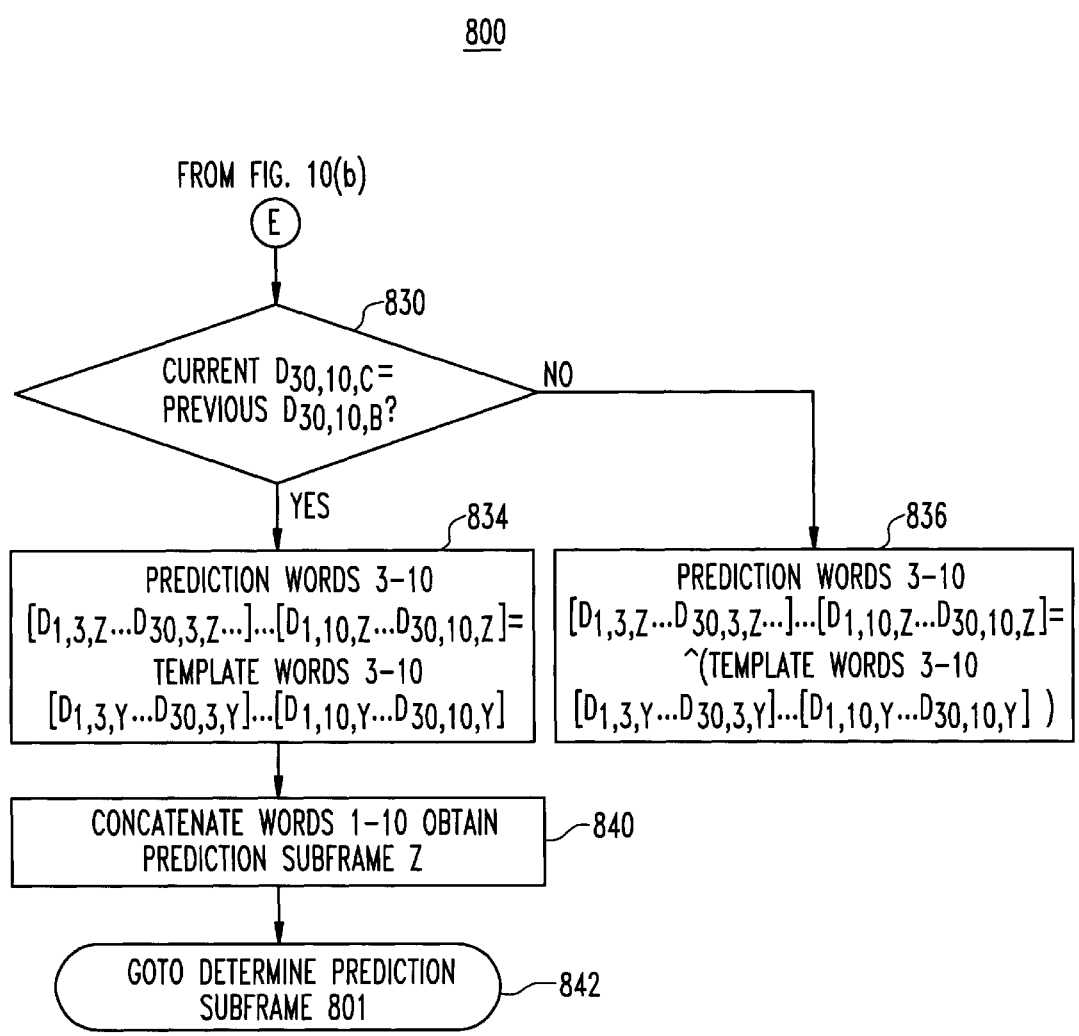
Figure 12:
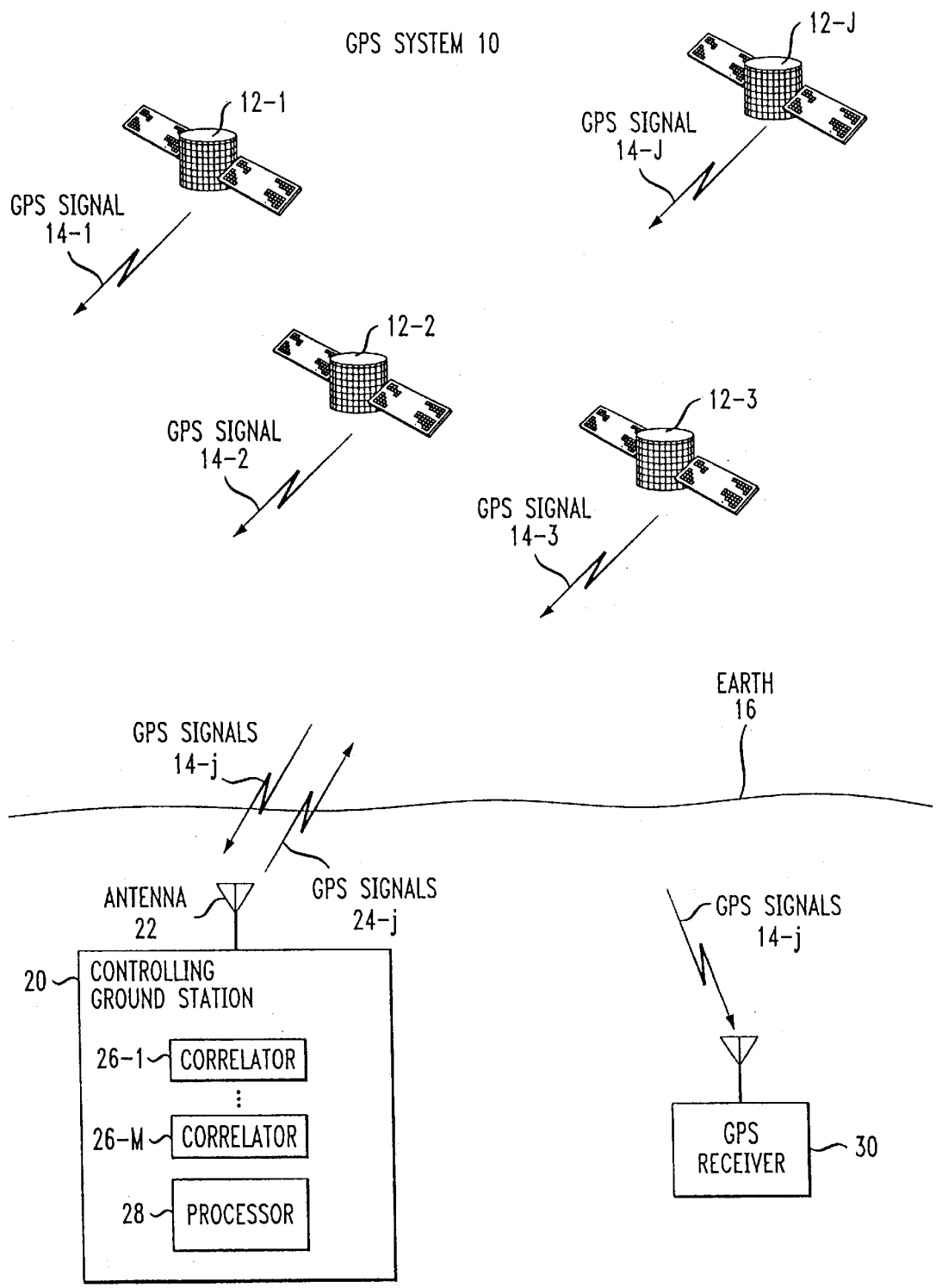
FIG. 12 depicts a well-known satellite-based navigation system referred to as the Global Positioning System (GPS) in accordance with the prior art.
Figure 13:
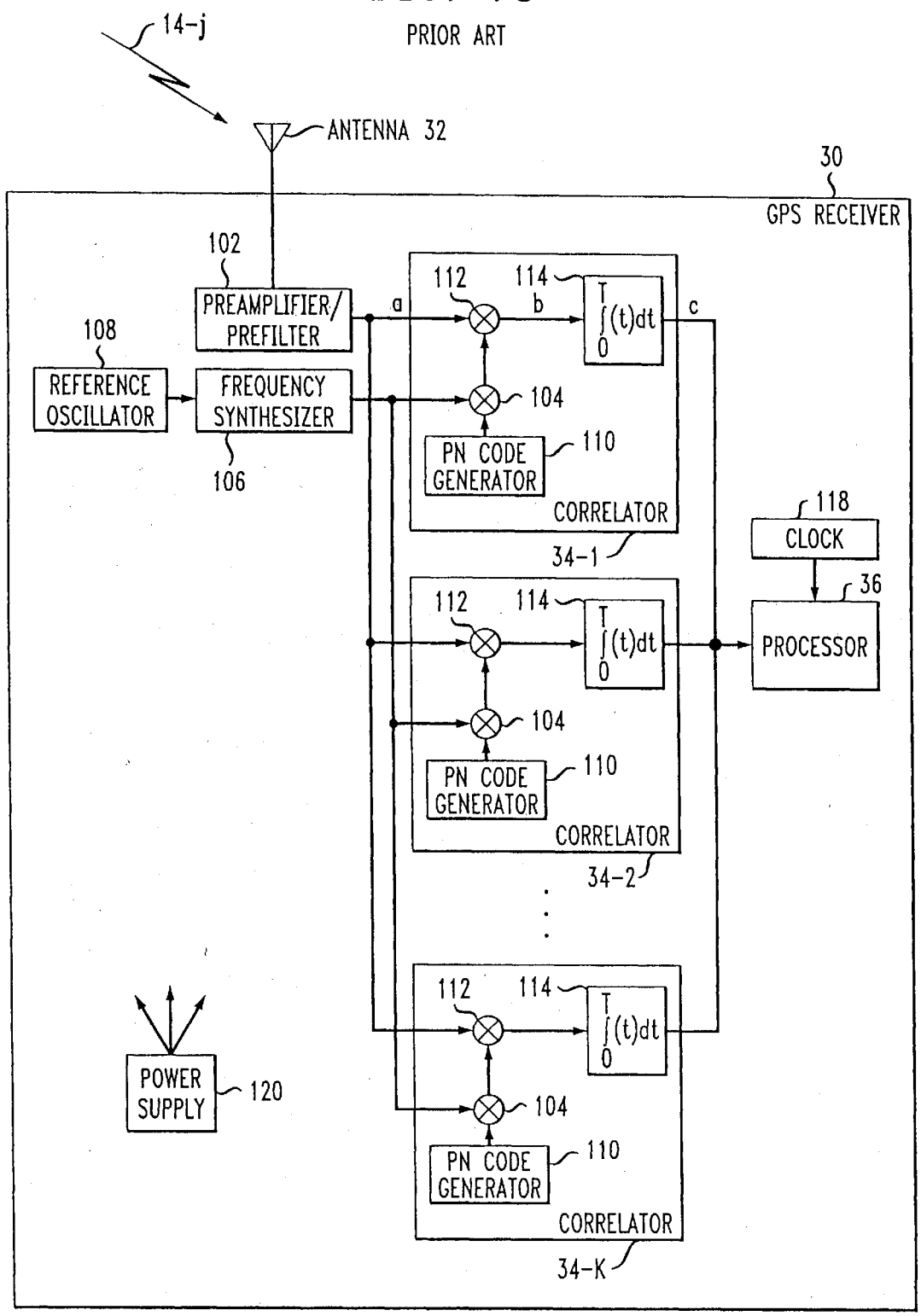
FIG. 13 depicts a GPS receiver in accordance with the prior art.
Figure 14:
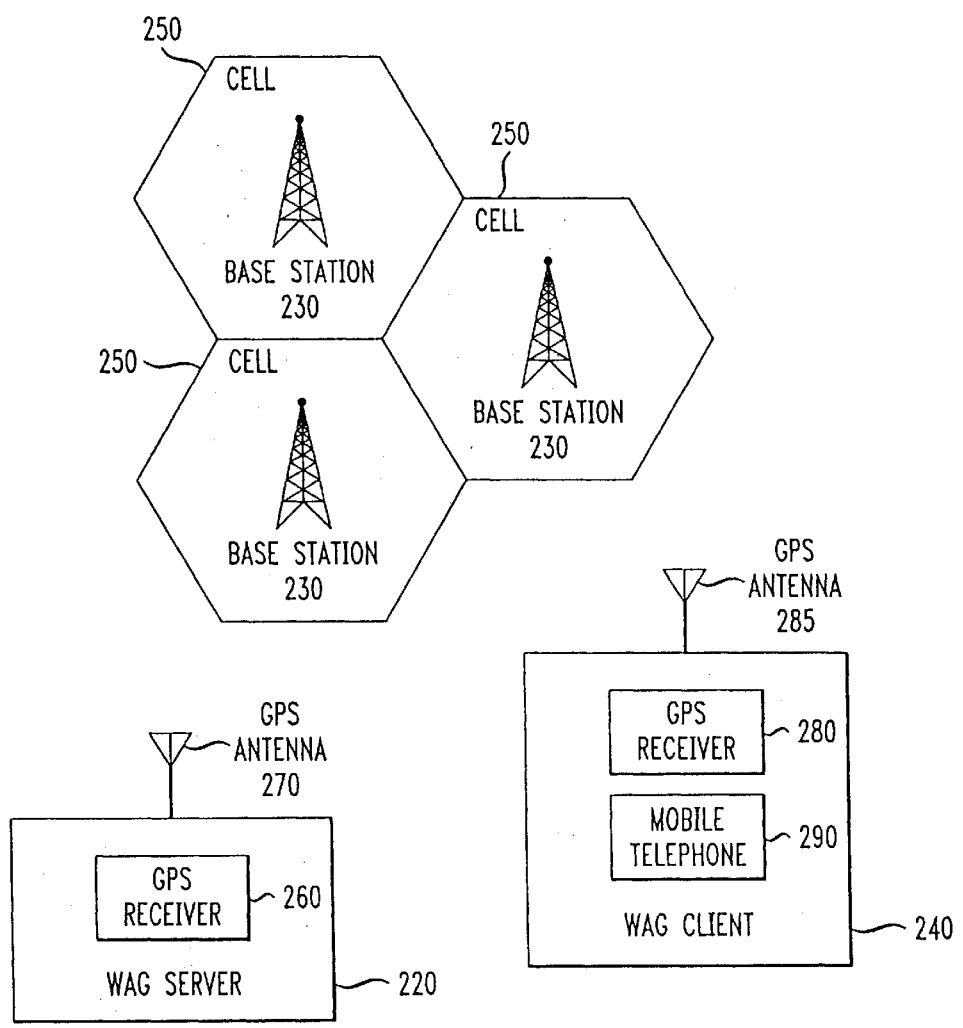
FIG. 14 depicts a Wireless Assisted GPS (WAG) system in accordance with the prior art.

FIGS. 10(a)–10(c) are flowchart 800 illustrating a subframe prediction program in accordance with one embodiment of the present invention for predicting a subframe. Note that the subframe prediction program could be modified to predict one word, multiple subframes, a bit stream of navigation data ND-j, etc.

In step 801, the subframe prediction program is initialized. In step 802, prediction subframe Z is determined. Determining which subframe is to be prediction subframe Z can be achieved in a variety of manners. For example, prediction subframe Z can be the subframe after current subframe C, a requested subframe, etc.

If prediction subframe Z is subframe four 42-4 or five 42-5, the next step is 804. In step 804, the page of subframe four 42-4 or five 42-5 is identified, as mentioned earlier, by examining the page ID parameter or satellite ID parameter, respectively. In step 806, the local data flag for the page of the subframe corresponding to prediction subframe Z or template subframe Y is checked. For example, if page six of subframe four 42-4 is prediction subframe Z, then the local data flag for page six of subframe four 42-4 is checked. If the local data flag is true, indicating prediction is possible using the local copy of the page for subframe four 42-4 or five 42-5, step 807 is next. In step 807, the local copy of the page for subframe four 42-4 or five 42-5 (depending on the particular subframe being predicted) is set to be template subframe Y from which prediction subframe Z is to be determined. For example, if prediction subframe Z corresponds to subframe four 42-4, then a local copy of subframe four 42-4 is set to be template subframe Y. If the local data flag is false, indicating prediction is not possible using the local copy of the page for subframe four 42-4 or five 42-5, step 808 is next. In step 808, the local data flag for the page of the subframe corresponding to prediction subframe Z or template subframe Y, is checked. If the global data flag is true, indicating prediction is possible using the global copy of the page for subframe four 42-4 or five 42-5, step 809 is next. In step 809, the global copy of the page of subframe four 42-4 or five 42-5 is set to be template subframe Y from which prediction subframe Z is to be determined. If the global data flag is false, indicating prediction is not possible using the global copy of the page for subframe four 42-4 or five 42-5, the subframe prediction program returns to step 801 via step 810.

If prediction subframe Z is subframe one 42-1, two 42-2 or three 42-3, the next step after step 802 is step 803. In step 803, the subframe data flag corresponding to prediction subframe Z or template subframe Y is checked. For example, if subframe two 42-2 is prediction subframe Z, then the subframe data flag for subframe two 42-2 is checked. If the subframe data flag is true indicating prediction of prediction subframe Z is possible, step 805 is next. In step 805, subframe one 42-1, two 42-2 or three 42-3 (depending on prediction subframe Z) is set to be template subframe Y from which prediction subframe Z is determined. If the subframe data flag is false indicating prediction is not possible, the next step is 810. In step 810, prediction subframe Z is not predicted and the subframe prediction program returns to step 801.

Step 812 begins the process of predicting word one 50-1 of prediction subframe Z. Current subframe C is compared to previous version subframe B to determine whether navigation data ND-j has been complemented. For ease of discussion, specific bits will hereinafter be referenced using the following nomenclature: $D_{bit,word,subframe}$. For example, bit $D_{30,10,C}$ references the thirtieth bit of word ten 42-10 of current subframe C, whereas bit $D_{28,2,Y}$ references the twenty-eighth bit of word two 42-2 of template subframe Y. Specifically, in step 812, parity bit $D_{30,10,C}$ is compared to parity bit $D_{30,10,B}$. If parity bit $D_{30,10,C}$ is equal to parity bit $D_{30,10,B}$, indicating current subframe C is an uncomplemented version of previous version subframe B, then word one 50-1 of prediction subframe Z is set equal to word one 50-1 of template subframe Y, in step 814. If parity bit $D_{30,10,C}$ is not equal to parity bit $D_{30,10,B}$, indicating current subframe C is a complemented version of previous version subframe B, then word one 50-1 of prediction subframe Z is set equal to the complement of word one 50-1 of template subframe Y, in step 816.

In step 820, which begins the process of predicting word two 50-2 of prediction subframe Z, parity bit $D_{30,10,Y}$ is checked to determine whether navigation data ND-j of template subframe Y has been complemented. If parity bit $D_{30,10,Y}$ is a logical 0, indicating template subframe Y is uncomplemented, then navigation data bits $D_{18,2,Z}$ ... $D_{22,2,Z}$ are set equal to navigation data bits $D_{18,2,Y}$ ... $D_{22,2,Y}$ in step 822. IF parity bit $D_{30,10,Y}$ is a logical 1 indicating template subframe Y is complemented, then navigation data bits $D_{18,2,Z}$ ... $D_{22,2,Z}$ are set equal to the complement of navigation data bits $D_{18,2,Y}$ ... $D_{22,2,Y}$ in step 824. In step 826, navigation data bits $D_{1,2,Z}$ ... $D_{17,2,Z}$, corresponding to the TOW message, are set equal to navigation data bits $D_{1,2,C}$ ... $D_{17,2,C}$ and then incremented one time unit for every subframe from current subframe C to and including prediction subframe Z. For example, if prediction subframe Z is the subframe immediately succeeding current subframe C, as shown in the example of FIG. 9, the TOW message in current subframe C is incremented one time unit. In step 828, supplemental parity bits $D_{23,2,Z}$ and $D_{24,2,Z}$ and parity bits $D_{25,2,Z}$ ... $D_{28,2,Z}$ are predicted according to a parity algorithm.

FIGS. 11(*a*)–11(*d*) depicts flowchart 740 of a parity algorithm used in accordance with one embodiment of the present invention for calculating supplemental parity bits $D_{23,2,Z}$ and $D_{24,2,Z}$, and parity bits $D_{25,2,Z}$ ... $D_{28,2,Z}$. Flowchart 740 depicts a manner of determining supplemental parity bits $D_{23,2,Z}$ and $D_{24,2,Z}$ and parity bits $D_{25,2,Z}$ ... $D_{28,2,Z}$ using navigation data bits $D_{1,2,Z}$ ... $D_{22,2,Z}$ parity bits $D_{29,2,Z}$ and $D_{30,2,Z}$ and parity bits $D_{29,1,Z}$ and $D_{30,1,Z}$. Recall that parity bits $D_{29,2,Z}$ and $D_{30,2,Z}$ are always set to zero. A modulo two sum operation is performed in step 741 between navigation data bit $D_{1,2,Z}$ and parity bit $D_{30,1,Z}$. The modulo two sum of navigation data bit $D_{1,2,Z}$ and parity bit $D_{30,1,Z}$ is represented by $d_{1,2,Z}$. Likewise, in steps 742, ... 762, modulo two sums operations are performed between the next navigation data bits (i.e. $D_{2,2,Z}$, $D_{3,2,Z}$, ... $D_{24,2,Z}$) and parity bit $D_{30,1,Z}$ to obtain the modulo two sums (i.e. $d_{2,2,Z}$, $d_{3,2,Z}$, ... $d_{24,2,Z}$).

In step 763, modulo two sum operations are performed between $D_{30,1,Z}$, $d_{1,2,Z}$, $d_{1,2,Z}$, $d_{5,2,Z}$, $d_{6,2,Z}$, $d_{7,2,Z}$, $d_{9,2,Z}$, $d_{10,2,Z}$, $d_{14,2,Z}$, $d_{15,2,Z}$, $d_{16,2,Z}$, $d_{17,2,Z}$, $d_{18,2,Z}$, $d_{21,2,Z}$ and $d_{22,2,Z}$ to obtain $d_{24,2,Z}$. in step 764, modulo two sum operations are performed between $D_{29,1,Z}$, $d_{3,2,Z}$, $d_{5,2,Z}$, $d_{6,2,Z}$, $d_{8,2,Z}$, $d_{9,2,Z}$, $d_{10,2,Z}$, $d_{11,2,Z}$, $d_{13,2,Z}$, $d_{15,2,Z}$, $d_{19,2,Z}$, $d_{22,2,Z}$ and $d_{24,2,Z}$ to obtain $d_{23,2,Z}$. In step 765, a modulo two sum operation is performed between $d_{23,2,Z}$ and $D_{30,1,Z}$ to obtain $D_{23,2,Z}$. In step 766, a modulo two sum operation is performed between $d_{24,2,Z}$ and $D_{30,1,Z}$ to obtain $D_{24,2,Z}$. In step 775, modulo two sum operations are performed between $D_{29,1,Z}$, $d_{1,2,Z}$, $d_{2,2,Z}$, $d_{3,2,Z}$, $d_{5,2,Z}$, $d_{6,2,Z}$, $d_{10,2,Z}$, $d_{11,2,Z}$, $d_{12,2,Z}$, $d_{13,2,Z}$, $d_{14,2,Z}$, $d_{17,2,Z}$, $d_{18,2,Z}$, $d_{20,2,Z}$ and $d_{23,2,Z}$ to obtain $D_{25,2,Z}$. In step 776, modulo two sum operations are performed between $D_{30,1,Z}$, $d_{2,2,Z}$, $d_{3,2,Z}$, $d_{4,2,Z}$, $d_{6,2,Z}$, $d_{7,2,Z}$, $d_{11,2,Z}$, $d_{12,2,Z}$, $d_{13,2,Z}$, $d_{14,2,Z}$, $d_{15,2,Z}$, $d_{18,2,Z}$, $d_{19,2,Z}$, $d_{21,2,Z}$ and $D_{24,2,Z}$ to obtain $D_{26,2,Z}$. In step 777, modulo two sum operations are performed between $D_{29,1,Z}$, $d_{3,2,Z}$, $d_{4,2,Z}$, $d_{5,2,Z}$, $d_{7,2,Z}$, $d_{8,2,Z}$, $d_{12,2,Z}$, $d_{13,2,Z}$, $d_{14,2,Z}$, $d_{15,2,Z}$, $d_{16,2,Z}$, $d_{19,2,Z}$, $d_{20,2,Z}$ and $d_{22,2,Z}$ to obtain $D_{27,2,Z}$. In step 778, modulo two sum operations are performed between $D_{30,1,Z}$, $d_{2,2,Z}$, $d_{4,2,Z}$, $d_{5,2,Z}$, $d_{6,2,Z}$, $d_{8,2,Z}$, $d_{9,2,Z}$, $d_{13,2,Z}$, $d_{14,2,Z}$, $d_{15,2,Z}$, $d_{16,2,Z}$, $d_{17,2,Z}$, $d_{20,2,Z}$, $d_{21,2,Z}$ and $d_{23,2,Z}$ to obtain $D_{28,2,Z}$. $D_{29,2,Z}$ and $D_{30,2,Z}$ are zero, as mentioned earlier.

Returning to FIGS. 10(*a*)–10(*c*) navigation data bits $D_{1,2,Z}$ ... $D_{17,2,Z}$, navigation data bits $D_{18,2,Z}$ ... $D_{22,2,Z}$, supplemental parity bits $D_{23,2,Z}$ and $D_{24,2,Z}$, and parity bits $D_{25,2,Z}$ ... $D_{30,2,Z}$ are concatenated, in step 829, to form word two 50-2 for prediction subframe Z. Next, step 830 begins the process of predicting words three 50-3 through ten 50-10 of prediction subframe Z. Current subframe C is compared to previous version subframe B to determine whether navigation data ND-j of current subframe C has been complemented. Specifically, parity bit $D_{30,10,C}$ is compared to parity bit $D_{30,10,B}$. If parity bit $D_{30,10,C}$ is equal to parity bit $D_{30,10,B}$, indicating current subframe C is an uncomplemented version of previous version subframe B, then words three 50-3 through ten 50-10 of prediction subframe Z are set equal to words three 50-3 through ten 50-10 of template subframe Y in step 834. If parity bit $D_{30,10,C}$ is not equal to parity bit $D_{30,10,B}$, indicating current subframe C is a complemented version of previous version subframe B, then words three 50-3 through ten 50-10 of prediction subframe Z are set equal to the complement of words three 50-3 through ten 50-10 of template subframe Y in step 836. Words one 50-10 through ten 50-10 are concatenated in step 840 to form prediction subframe Z. In step 842, the subframe prediction program returns to step 801 to predict a next prediction subframe Z+1.

Once future navigation data is predicted, the future navigation data ND-j and the action time (or some indication thereof) are transmitted by WAG server 220 to WAG client 240. Upon receipt of the transmission, WAG client 240 performs data wipeoff of navigation data ND-j at the action time from GPS signals 14-j using the future navigation data ND-j. Included with the future navigation data ND-j and the action time may be a satellite indicator, such as a PN-j code, to identify the satellite 12-j to which the future navigation data ND-j is associated such that the future navigation data ND-j is only used to perform data wipeoff of navigation data ND-j in GPS signals 14-j transmitted by the identified satellite 12-j.

The present invention is described herein with reference to certain embodiments. Other embodiments are possible. For example, a copy of the TLM message may be stored separately from other previously received navigation data in order to simplify updating the TLM message and reduce storage space by keeping one copy of the TLM message for all satellite navigation data ND-j. In addition, storage of parity bits for each word 50-p is not necessary since the parity bits can be recalculated according to the algorithm described in FIG. 6. Accordingly, the present invention should not be limited to the embodiments disclosed herein.

We claim:

1. A method of predicting future navigation data comprising the steps of:

receiving navigation data; and predicting the future navigation data using the received navigation data, wherein predicting the future navigation data includes determining a future time of week message corresponding to an action time using a received time of week message in the received navigation data.

2. The method of claim 1, wherein the predicted future navigation data is valid at an action time.

3. The method of claim 2 comprising the additional step of:

transmitting the future navigation data and the action time.

4. The method of claim 1, wherein the received navigation data includes a received subframe to which the received time of week message belongs and the future navigation data includes a prediction subframe to which the future time of week message belongs, the step of determining the future time of week message comprising the step of:

incrementing the received time of week message a time unit for every subframe from the received subframe to and including the prediction subframe.

5. The method of claim 1, wherein the step of predicting the future navigation data comprises the step of:

determining parity bits based on the determined future time of week message and the received navigation data.

6. The method of claim 1, wherein the step of receiving navigation data comprises the step of:

checking the received navigation data to determine whether the received navigation data has errors.

7. The method of claim 6, wherein the step of receiving navigation data comprises the step of:

storing the received navigation data if the received navigation data has no errors.

8. The method of claim 6, wherein the step of receiving navigation data comprises the steps of:

identifying a source from which the received navigation data was transmitted; and storing the received navigation data for the identified source if the received navigation data has no errors.

9. The method of claim 6, wherein the step of receiving navigation data comprises the step of:

discarding the received navigation data if the received navigation data has errors.

10. The method of claim 1, wherein the step of predicting the future navigation data comprises the step of:

determining whether the received navigation data is a part of a new navigation data set.

11. The method of claim 10, wherein the received navigation data is a part of the new navigation data set if a change is detected between stored navigation data and the received navigation data in one of the following parameters: issue of data for ephemeris or issue of data for clock.

12. The method of claim 10, wherein the future navigation data is predicted if the received navigation data is not a part of the new navigation data set, the future navigation data is not predicted if the received navigation data is a part of the new navigation data set.

13. The method of claim 1, wherein the step of predicting the future navigation data comprises the step of:

determining whether the received navigation data is sufficient for predicting the future navigation data, the future navigation data is predicted if the received navigation data is sufficient, the future navigation data is not predicted if the received navigation data is not sufficient.

14. The method of claim 1, wherein the step of receiving navigation data comprises the step of:

updating stored navigation data with the received navigation data.

15. The method of claim 14, wherein the stored navigation data is updated using a complemented version of the received navigation data if the received navigation data was complemented, the stored navigation data is updated using an uncomplemented version of the received navigation data if the received navigation data was uncomplemented.

16. The method of claim 1, wherein the received navigation data is a part of a GPS signal.

17. The method of claim 1, wherein the future navigation data is associated with a satellite.

18. A method of performing data wipeoff comprising the steps of:

receiving future navigation data and an action time, wherein the future navigation data includes a future time of week message corresponding to an action time based on past navigation data; and performing data wipeoff using the future navigation data at the action time.

19. The method of claim 18, wherein the future navigation data includes a predicted time of week message based on received navigation data and parity bits based on the predicted time of week message and the received navigation data.

20. The method of claim 18, comprising the additional step of:

receiving a source identifier indicating a source associated with the future navigation data, wherein data wipeoff is performed for signals transmitted by the indicated source using the future navigation data.

* * * * *